(12) United States Patent
Jamieson

(10) Patent No.: US 10,915,979 B2
(45) Date of Patent: Feb. 9, 2021

(54) LOCATION-TRIGGERED REMOTE DISPENSING DEVICE ACTIVATION SYSTEMS AND METHODS

(71) Applicant: Roxor Gaming Limited, London (GB)

(72) Inventor: Nick Jamieson, London (GB)

(73) Assignee: Gamesys Ltd., London (GB)

( * ) Notice: Subject to any disclaimer, the term of this patent is extended or adjusted under 35 U.S.C. 154(b) by 167 days.

(21) Appl. No.: 15/001,861

(22) Filed: Jan. 20, 2016

(65) Prior Publication Data

US 2016/0210712 A1 Jul. 21, 2016

Related U.S. Application Data

(60) Provisional application No. 62/105,359, filed on Jan. 20, 2015.

(51) Int. Cl.
*G06Q 50/34* (2012.01)
*G06Q 20/32* (2012.01)
*G07F 17/32* (2006.01)
*G07F 9/00* (2006.01)

(52) U.S. Cl.
CPC ......... *G06Q 50/34* (2013.01); *G06Q 20/3224* (2013.01); *G07F 9/002* (2020.05); *G07F 17/3253* (2013.01)

(58) Field of Classification Search
CPC .. G07F 17/3258; G07F 17/3293; G07F 9/002; G07F 17/3253; G06Q 50/34; G06Q 20/3224

See application file for complete search history.

(56) References Cited

U.S. PATENT DOCUMENTS

| | | | | |
|---|---|---|---|---|
| 5,951,011 A * | 9/1999 | Potter | ................. | A63F 3/00157 273/292 |
| 7,780,520 B2 * | 8/2010 | Baerlocher | ............. | G07F 17/32 273/138.1 |
| 7,905,778 B2 * | 3/2011 | Breckner | ............ | G07F 17/3258 463/16 |
| 7,914,377 B2 * | 3/2011 | Benbrahim | ............. | G07F 17/34 463/25 |
| 7,963,845 B2 * | 6/2011 | Baerlocher | ............. | G07F 17/32 463/25 |
| 8,128,472 B1 * | 3/2012 | Lyons | ................. | G07F 17/3276 463/13 |
| 8,128,491 B2 * | 3/2012 | Vasquez | ................. | G07F 17/32 463/16 |
| 8,137,180 B2 * | 3/2012 | Thomas | ................. | G07F 17/34 463/18 |

(Continued)

*Primary Examiner* — Malina D. Blaise
(74) *Attorney, Agent, or Firm* — Fincham Downs LLC; Carson C.K. Fincham

(57) ABSTRACT

Systems, methods, and articles of manufacture provide for location-triggered remote dispensing device activation. Various types of dispensing devices as described herein, for example, may be triggered to provide output goods or services based upon location-based data of a user of a centralized system. In some embodiments, such remote dispensing device activation may be conducted in a manner that is less taxing on memory, data processing, and/or network communications bandwidth than previously known or practicable. In some cases, the dispensed goods/services may be provided via remote dispensing in response to location-specific data pursuant to variable game results.

9 Claims, 13 Drawing Sheets

(56) References Cited

U.S. PATENT DOCUMENTS

| | | | | |
|---|---|---|---|---|
| 8,182,338 | B2* | 5/2012 | Thomas | G07F 17/32 463/25 |
| 8,591,313 | B2* | 11/2013 | Gomez | G07F 17/3206 463/16 |
| 2001/0031659 | A1* | 10/2001 | Perrie | A63F 3/00075 463/18 |
| 2002/0039923 | A1* | 4/2002 | Cannon | G07F 17/3211 463/42 |
| 2004/0048644 | A1* | 3/2004 | Gerrard | G07F 17/32 463/16 |
| 2006/0131809 | A1* | 6/2006 | Lancaster | G07F 17/32 273/292 |
| 2007/0060274 | A1* | 3/2007 | Rowe | G07F 17/32 463/16 |
| 2007/0060286 | A1* | 3/2007 | Sacks | G07F 17/3255 463/18 |
| 2007/0060321 | A1* | 3/2007 | Vasquez | G07F 17/32 463/27 |
| 2008/0305855 | A1* | 12/2008 | Czyzewski | G07F 17/32 463/25 |
| 2009/0191942 | A1* | 7/2009 | Bennett | G07F 17/32 463/20 |
| 2010/0240448 | A1* | 9/2010 | Keenan | G07F 17/3232 463/27 |
| 2010/0267439 | A1* | 10/2010 | Englman | G07F 17/3274 463/20 |
| 2012/0178528 | A1* | 7/2012 | Brunell | G07F 17/3216 463/31 |
| 2013/0137508 | A1* | 5/2013 | Kelly | G07F 17/3255 463/27 |
| 2014/0024444 | A1* | 1/2014 | Lowell | G07F 17/3258 463/27 |

* cited by examiner

LOCATION-TRIGGERED REMOTE DISPENSING DEVICE ACTIVATION SYSTEMS AND METHODS

CROSS-REFERENCE TO RELATED APPLICATIONS

The present application claims benefit and priority to, and is a non-provisional of, U.S. Provisional Patent Application No. 62/105,359 filed on Jan. 20, 2015, the entirety of which is hereby incorporated by reference herein.

BACKGROUND

Various activities that may be conducted at various remote locations may be associated with user activities and interactions with centralized data processing systems. In some cases, it may be desirable to have one or more user devices that are remotely located from the centralized data processing system be activated, such as to cause a dispensing to the user.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Figure 1:
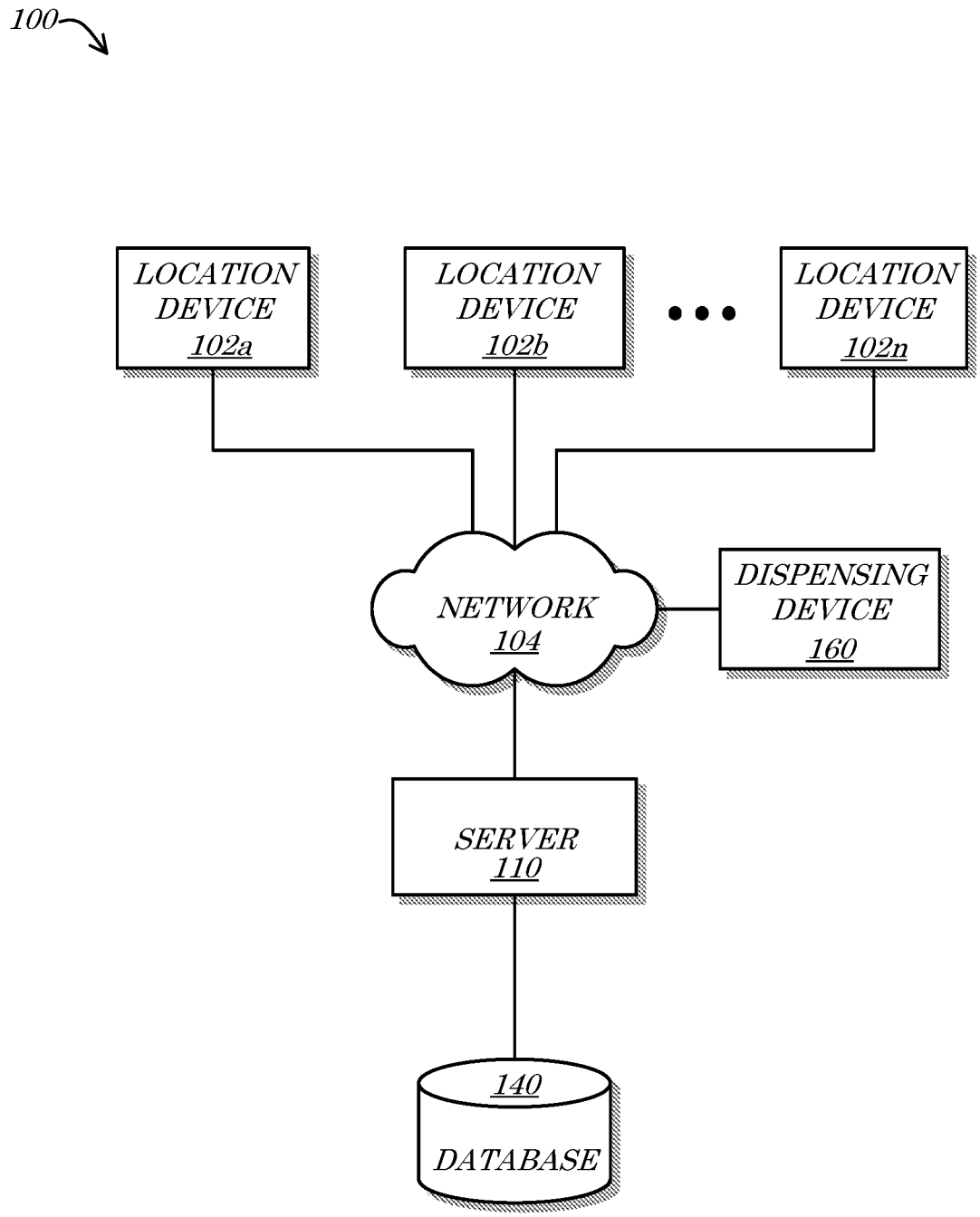
FIG. 1 is a block diagram of a system according to some embodiments.

Embodiments presented herein are descriptive of systems, apparatus, methods, and articles of manufacture for location-triggered remote dispensing device activation. Various types of dispensing devices as described herein, for example, may be triggered to provide output goods or services based upon location-based data of a user of a centralized system. In some embodiments, such remote dispensing device activation may be conducted in a manner that is less taxing on memory, data processing, and/or network communications bandwidth than previously known or practicable.

In some embodiments, the remote device activation and/or dispensing may involve providing variable game results to a user or player of an online game. In some embodiments, a typical payout structure of a common game format that is based on a primary paytable may be supplemented with results and/or awards based on a secondary paytable. Such results may be provided to a user/player via remote activation of a user/player device. The user/player device may be remotely activated to output the results via a specialized interface display, for example, and/or physical or electronic financial rewards in accordance with the results may be provided by a remote dispensing device, e.g., located proximate to a current location of the user/player.

In some embodiments for example, players of online games may, due to chance and/or skill, earn various prizes as a result of their game play. Such players may also, according to some embodiments, be selected for participation in a "Hot Seat" game promotion. The "Hot Seat" game promotion, for example, may include randomly-selected players/accounts/seats of an online gaming community, may include players/accounts/seats that have bought-into (e.g., initiated) the "Hot Seat" feature, may include a selection of all players/accounts/seats of a particular type (e.g., all cash gaming players, all poker players, all bingo player of a particular type of bingo game, etc.), and/or may include a selection of players/accounts/seats based on gameplay merit (e.g., gameplay accomplishments such as scores, bonuses, and/or achievements).

According to some embodiments, a payout structure (e.g., different from a primary payout structure or paytable for any primary or base game being played by any "Hot Seat" promotion member; e.g., a secondary payout structure or paytable) may be applied to the set of players/accounts/seats associated with a particular instance of the "Hot Seat" promotion. The "Hot Seat" payout structure may be predetermined or may be randomly selected from a set of available payout structures (e.g., a selection of a subset of available paytables). According to some embodiments, the payout structure may assign or allocate different prizes (or potential prizes) to each player/account/seat of the "Hot Seat" promotion. Different players may accordingly, for example, have the potential to win different amounts, e.g., simply due to their particular game play position, seat, player account identifier, player name, and/or other player characteristic—e.g., randomly.

In some embodiments, the allocated prizes may be revealed to the "Hot Seat" players or portions thereof at various times. Some or all of the prizes may be revealed prior to being earned or won, for example, while some or all of the prizes may only be revealed upon having been earned or won. According to some embodiments, the winning of the "Hot Seat" prize allocated to a particular player/account/seat may be random, merit based (e.g., based on underlying game play of a primary game played by a player), and/or may be based on various events of or external to the underlying primary game (e.g., a player that is dealt the highest card in a round of poker or blackjack may win the "Hot Seat" (irrespective of whether they win the underlying poker or blackjack game) or the player with the highest heart rate or other personal characteristic or that has recently visited a destination closest to a 'target' destination (e.g., based on credit card purchase records), may win the "Hot Seat").

II. Terms and Definitions

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. While not generally limiting and while not limiting for all described embodiments, in some embodiments, the terms are specifically limited to the example definitions and/or examples provided. Other terms are defined throughout the present description.

A "dispensing device", as the term is used herein (unless specified otherwise), may generally comprise any mechanical, electric, electro-mechanical, and/or other device capable of providing rewards to users/players, e.g., at one or more locations remote from a centralized data processing (e.g., online gaming) system. A dispensing device may provide physical and/or electronic outputs to a user/player. Physical outputs may include, for example, currency (such as bills or coins), tokens, chips, gift certificates, stored-value cards, magnetic stripe cards, smart cards, and/or vouchers. Electronic outputs may include data displayed via specialized interfaces (such as an identifier and/or code representative of virtual currency, a redemption code, etc.) and/or data electronically transmitted as a command such that monetary value is transferred from one financial account to another (e.g., an Electronic Funds Transfer (EFT), money "wire" transfer, etc.). In some embodiments, a dispensing device may comprise an Automated Teller Machine (ATM), a currency dispenser device, a voucher and/or gift/electronic-readable card printer or dispenser, and/or a mobile computing device linked to one or more financial accounts (e.g., executing a smart wallet, e-wallet, and/or other financial account connectivity application).

A "game", as the term is used herein (unless specified otherwise), may generally comprise any game (e.g., wagering or non-wagering, electronically playable over a network) playable by one or more players in accordance with specified rules. A game may be playable on a Personal Computer (PC) online in web browsers, on a game console and/or on a mobile device such as a smart-phone or tablet computer. "Gaming" thus generally refers to play of a game.

A "casual game", as the term is used herein (unless specified otherwise), may generally comprise (and in specific embodiments may be expressly limited to) a game with simple rules with little or no time commitment on the time of a player to play. A casual game may feature, for example, very simple game play such as a puzzle or Scrabble™ game, may allow for short bursts of play (e.g., during work breaks), an ability to quickly reach a final stage and/or continuous play without a need to save the game.

A "social network game", as used herein (unless specified otherwise), generally refers to (and in specific embodiments may be expressly limited to) a type of online game that is played through a social network, and in some embodiments may feature multiplayer and asynchronous game play mechanics. A "social network" may refer to an online service, online community, platform, or site that focuses on facilitating the building of social networks or social relations among people. A social network service may, for example, consist of a representation of each user (often a profile), his/her social links, and a variety of additional services. A social network may be web-based and provide means for users to interact over the Internet, such as e-mail and instant messaging. A social network game may in some embodiments be implemented as a browser game, but can also be implemented on other platforms such as mobile devices.

A "wagering game", as the term is used herein (unless specified otherwise), may generally comprise (and in specific embodiments may be expressly limited to) a game on which a player can risk a wager or other consideration, such as, but not limited to: slot games, poker games, blackjack, baccarat, craps, roulette, lottery, bingo, keno, casino war, etc. A wager may comprise a monetary wager in the form of an amount of currency or any other tangible or intangible article having some value which may be risked on an outcome of a wagering game. "Gambling" or "wagering" generally refers to play of a wagering game.

The term "game provider", as used herein (unless specified otherwise), generally refers to (and in specific embodiments may be expressly limited to) an entity or system of components which provides games for play and facilitates play of such game by use of a network such as the Internet or a proprietary or closed networks (e.g., an intranet or wide area network). For example, a game provider may operate a website which provides games in a digital format over the Internet. In some embodiments in which a game comprising a wagering game is provided, a game provider may operate a gambling website over which wagers are accepted and results of wagering games are provided.

As utilized herein, the term "player" may generally refer to (and in specific embodiments may be expressly limited to) any type, quantity, and or manner of entity associated with the play of a game. In some embodiments, a player may comprise an entity conducting play of an online game, for example, may comprise an entity that desires to play a game (e.g., an entity registered and/or scheduled to play and/or an entity having expressed interest in the play of the game—e.g., a spectator) and/or may comprise an entity that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game). In some embodiments, a player may comprise an individual (or group) that enters, joins, logs into, registers for, and/or otherwise access an online game room, session, server, and/or other particular instance and/or segmentation of an online game.

Some embodiments described herein are associated with a "player device" or a "network device". As used herein, a "player device" is a subset of a "network device". The "network device", for example, may generally refer to any device that can communicate via a network, while the "player device" may comprise a network device that is owned and/or operated by or otherwise associated with a player. Examples of player and/or network devices may include, but are not limited to: a PC, a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components.

As used herein, the term "network component" may refer to a player or network device, or a component, piece, portion, or combination of player or network devices. Examples of network components may include a Static Random Access Memory (SRAM) device or module, a network processor, and a network communication path, connection, port, or cable.

In addition, some embodiments are associated with a "network" or a "communication network." As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term "indication", as used herein (unless specified otherwise), may generally refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

A "session", as the term is used herein (unless indicated otherwise), may generally comprise (and in specific embodiments may be expressly limited to) a period of time spanning a plurality of event instances or turns of the game, the session having a defined start and defined end. An event instance or turn is triggered upon an initiation of, or request for, at least one result of the game by a player, such as an actuation of a "start" or "spin" mechanism, which initiation causes an outcome to be determined or generated (e.g., a random number generator is contacted or communicated with to identify, generate or determine a random number to be used to determine a result for the event instance).

As used herein, the terms "outcome" and "result" should be differentiated in the present description in that an "outcome" is generally a representation of a "result", typically comprising one or more game elements or game symbols. For example, in a "fruit themed" game, a winning outcome (i.e., an outcome corresponding to some kind of award, prize or payout) may comprise a combination of three "cherry" symbols. The "result" of this outcome may be a payout of X credits awarded to the player associated with the game. In another example, in a game in which a character moves along a game interface from a starting position to a finish position, an "outcome" of the game may comprise a symbol representing one or more movements along the interface and the "result" corresponding to this outcome may be the particular number and direction of the character's movement (e.g., three (3) spaces backwards such that the character ends up further away from the finish line). In a session embodiment, a session result may comprise a binary result (e.g., a player or game character wins or loses the session) and/or the particular award (or magnitude of award) won or earned by the player based on the session (e.g., the number of credits awarded to the player). It should be noted that the embodiments described herein encompass awards, prizes and payouts which are monetary, non-monetary, tangible or intangible.

As used herein, the term "virtual currency" may generally refer to an in-game currency that may be used as part of a game or one or more games provided by a game provider as (i) currency for making wagers, and/or (ii) to purchase or access various in-game items, features or powers.

A "credit balance", as the term is used herein (unless indicated otherwise), may generally refer to (i) a balance of currency, whether virtual currency and/or real currency, usable for making wagers in a game and/or (ii) another tracking mechanism for tracking a player's success or advancement in a game by deducting there from points or value for unsuccessful attempts at advancement and adding thereto points or value for successful attempts at advancement.

III. Location-Triggered Remote Dispensing Systems

Turning first to FIG. 1, a block diagram of a system 100 according to some embodiments is shown. In some embodiments, the system 100 may comprise a location-triggered remote dispensing device activation system. In some embodiments, the system 100 may comprise a gaming platform such as a gaming platform via which one or more multiplayer and/or online games may be played. In some embodiments, the system 100 may comprise a plurality of location devices 102*a-n* (e.g., user and/or player devices) in communication with and/or via a network 104. In some embodiments, a server 110 (e.g., an online gaming server) may be in communication with the network 104 and/or one or more of the location devices 102*a-n*. In some embodiments, the server 110 (and/or the location devices 102*a-n*) may be in communication with a database 140. The database 140 may store, for example, location data (e.g., player position, seat, and/or other location data), dispensing data, game date (e.g., result data processed and/or defined by the server 110), data associated with users/players (not explicitly shown) owning and/or operating the location devices 102*a-n*, and/or instructions that cause various devices (e.g., the server 110 and/or the location devices 102*a-n*) to operate in accordance with embodiments described herein. According to some embodiments, the system 100 may comprise a dispensing device 160. The database 140 may store, for example, data generated and/or processed by the server 110 (e.g., player location data), such data being utilized to trigger a dispensing by the dispensing device 160, that may, for example, be remotely located from the server 110.

According to some embodiments, any or all of the components 102*a-n*, 104, 110, 140, 160 of the system 100 may be similar in configuration and/or functionality to any similarly named and/or numbered components described herein. Fewer or more components 102*a-n*, 104, 110, 140, 160 (and/or portions thereof) and/or various configurations of the components 102*a-n*, 104, 110, 140, 160 may be included in the system 100 without deviating from the scope of embodiments described herein. While multiple instances of some components 102*a-n* are depicted and while single instances of other components 104, 110, 140, 160 are depicted, for example, any component 102*a-n*, 104, 110, 140, 160 depicted in the system 100 may comprise a single device, a combination of devices and/or components 102*a-n*, 104, 110, 140, 160, and/or a plurality of devices, as is or becomes desirable and/or practicable. Similarly, in some embodiments, one or more of the various components 102*a-n*, 104, 110, 140, 160 may not be needed and/or desired in the system 100.

The location devices 102*a-n*, in some embodiments, may comprise any type or configuration of electronic, mobile electronic, and or other network and/or communication devices (or combinations thereof) that are or become known or practicable. A first location device 102*a* may, for example, comprise one or more PC devices, computer workstations (e.g., game consoles and/or gaming computers), tablet computers, such as an iPad® manufactured by Apple®, Inc. of Cupertino, Calif., and/or cellular and/or wireless telephones such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, one or more of the location devices 102*a-n* may be specifically utilized and/or configured (e.g., via specially-programmed and/or stored instructions such as may define or comprise a software application) to communicate with the server 110 (e.g., via the network 104; e.g. to provide location data identifying a location of the location device 102*a-n* and/or a user/player thereof).

The network 104 may, according to some embodiments, comprise a LAN, WAN, cellular telephone network, Bluetooth® network, NFC network, and/or RF network with communication links between the location devices 102*a-n*, the server 110, the database 140, and/or the dispensing device 160. In some embodiments, the network 104 may comprise direct communications links between any or all of the components 102*a-n*, 110, 140, 160 of the system 100. The server 110 may, for example, be directly interfaced or connected to the database 140 via one or more wires, cables, wireless links, and/or other network components, such network components (e.g., communication links) comprising portions of the network 104. In some embodiments, the network 104 may comprise one or many other links or network components other than those depicted in FIG. 1. A second location device 102*b* may, for example, be connected to the server 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102*a-n*, 110, 140, 160 of the system 100. The network 104 may comprise one or more cellular telephone networks with communication links between the location devices 102*a-n* and the server 110, for example, and/or may comprise the Internet, with communication links between the location devices 102*a-n* and the database 140 and/or the dispensing device 160, for example.

According to some embodiments, the server 110 may comprise a device (and/or system) owned and/or operated by or on behalf of or for the benefit of a gaming entity (not explicitly shown; e.g., a "game server"). The gaming entity may utilize player (e.g., player location/seat/position) and/or game information or instructions (e.g., stored by the database 140), in some embodiments, to host, manage, analyze, design, define, price, conduct, and/or otherwise provide (or cause to be provided) one or more games such as online multiplayer games. In some embodiments, the gaming entity (and/or a third-party; not explicitly shown) may provide an interface (not shown in FIG. 1) to and/or via the location devices 102*a-n*. The interface may be configured, according to some embodiments, to allow and/or facilitate electronic game play by one or more players. In some embodiments, the system 100 (and/or interface provided by the server 110) may present game data (e.g., from the database 140) in such a manner that allows players to participate in one or more online games (singularly, in/with groups, and/or otherwise). According to some embodiments, the server 110 may cause and/or facilitate variable game results such as via utilization of "seat prizes", as described herein. The server 110 may, for example, cause a remotely-situated dispensing device 160 to be activated and/or to dispense an award to a user/player located at (and/or assigned to) a particular location.

In some embodiments, the database 140 may comprise any type, configuration, and/or quantity of data storage devices that are or become known or practicable. The database 140 may, for example, comprise an array of optical and/or solid-state hard drives configured to store player and/or game data, and/or various operating instructions, drivers, etc. While the database 140 is depicted as a stand-alone component of the system 100 in FIG. 1, the database 140 may comprise multiple components. In some embodiments, a multi-component database 140 may be distributed across various devices and/or may comprise remotely dispersed components. Any or all of the player devices 102*a-n* may comprise the database 140 or a portion thereof, for example, and/or the game server 110 may comprise the database 140 or a portion thereof.

According to some embodiments, the dispensing device 160 may comprise a device separate from one or all of the location devices 102*a-n*, such as a stand-alone ATM device, a printer device, and/or a separate or distinct kiosk, display, and/or other interface. The dispensing device 160 may, for example, comprise an ATM device that is remotely triggered (e.g., at least in part based on a player location/position; e.g., by or via the server 110) to dispense currency or other physical items of monetary value, to the player (or player device; e.g., the first location device 102*a*). In some embodiments, a remote trigger signal may be transmitted from the server 110, via the network 104, to the dispensing device 160, thereby activating functionality of the dispensing device remotely. According to some embodiments, such a trigger or command signal may be routed through and/or by various other devices (e.g., a credit card device, a financial institution device, a security device, a router, switch, etc.; none of which are explicitly shown in FIG. 1) to reach the dispensing device 160. In such a manner, for example, monetary value may be provided to the player via remote activation commands based on, e.g., a location of the player (e.g., a locational coordinate, address, or assigned position such as a position or seat in a game or at a venue).

Examples of remote location-triggered dispensing device activation (and/or control) with respect to specific implementations as applied to the field of online games comprising variable payout mechanisms are described in detail with reference to FIG. 2, FIG. 3, FIG. 4, FIG. 5, FIG. 6A, FIG. 6B, FIG. 7, and FIG. 8 below. These examples in the specified field are not limiting. Other types of games and/or other types of remote location-triggered dispensing device activation or control may be utilized without deviating from the embodiments contemplated herein.

IV. Location-Triggered Remote Dispensing Systems—Online Gaming Applications

Figure 2:
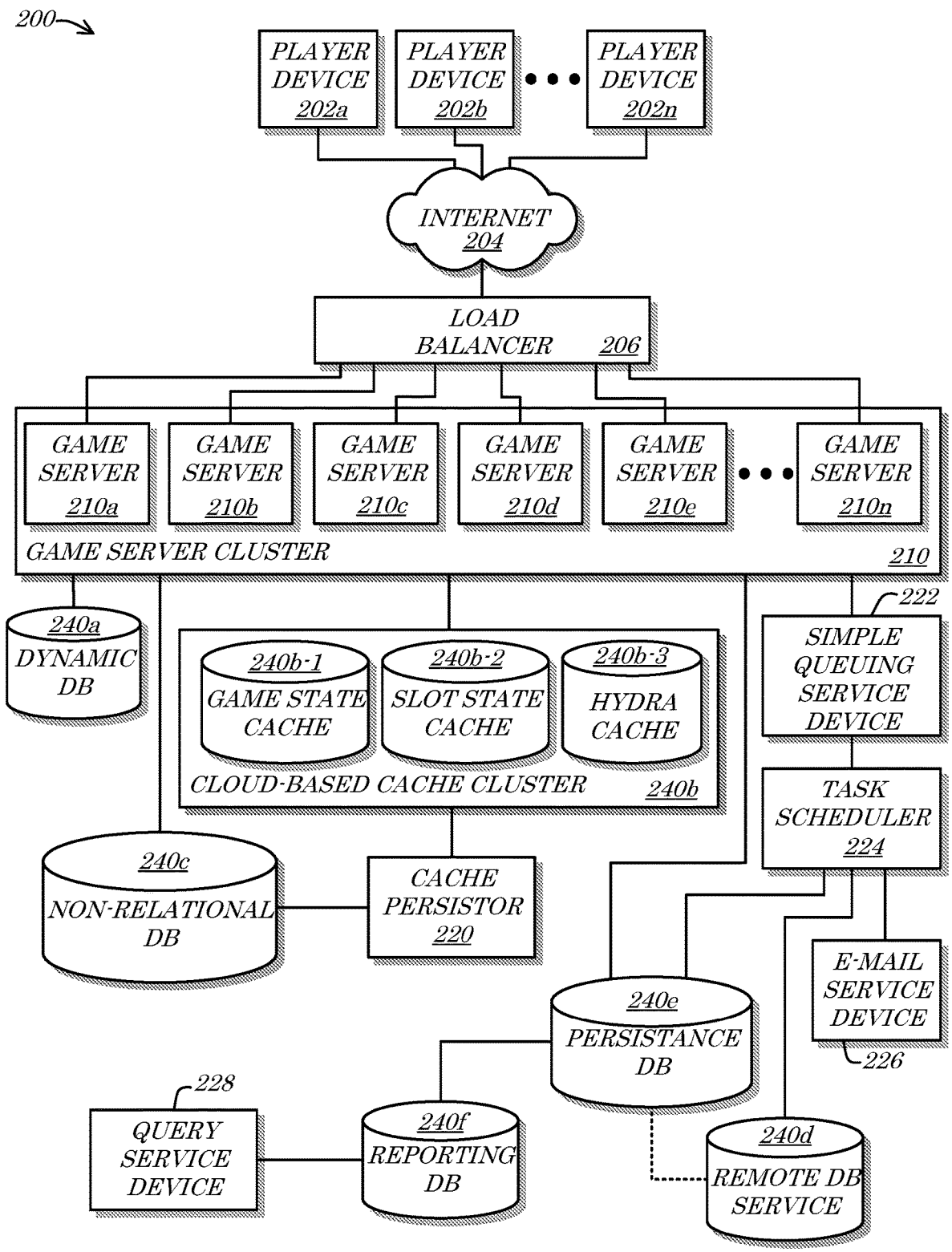
FIG. 2 is a block diagram of a system according to some embodiments.

Referring now to FIG. 2, a block diagram of a system 200 according to some embodiments is shown. In some embodiments, the system 200 may comprise a gaming platform such as a platform via which social, multiplayer, and/or online games may be played. In some embodiments, the system 200 may comprise a plurality of player devices 202a-n, the Internet 204, a load balancer 206, and/or a game server cluster 210. The game server cluster 210 may, in some embodiments, comprise a plurality of game servers 210a-n. In some embodiments, the system 200 may comprise a cache persistor 220, a Simple Queuing Service (SQS) device 222, a task scheduler 224, an e-mail service device 226, and/or a query service device 228. As depicted in FIG. 2, any or all of the various components 202a-n, 204, 206, 210a-n, 220, 222, 224, 226, 228 may be in communication with and/or coupled to one or more databases 240a-f. The system 200 may comprise, for example, a dynamic DataBase (DB) 240a, a cloud-based cache cluster 240b (e.g., comprising a game state cache 240b-1, a slot state cache 240b-2, and/or a "hydra" cache 240b-3), a non-relational DB 240c, a remote DB service 240d, a persistence DB 240e, and/or a reporting DB 240f.

According to some embodiments, any or all of the components 202a-n, 204, 206, 210a-n, 220, 222, 224, 226, 228, 240a-f of the system 200 may be similar in configuration and/or functionality to any similarly named and/or numbered components described herein. Fewer or more components 202a-n, 204, 206, 210a-n, 220, 222, 224, 226, 228, 240a-f (and/or portions thereof) and/or various configurations of the components 202a-n, 204, 206, 210a-n, 220, 222, 224, 226, 228, 240a-f may be included in the system 200 without deviating from the scope of embodiments described herein. While multiple instances of some components 202a-n, 210a-n, 240a-f are depicted and while single instances of other components 204, 206, 220, 222, 224, 226, 228 are depicted, for example, any component 202a-n, 204, 206, 210a-n, 220, 222, 224, 226, 228, 240a-f depicted in the system 200 may comprise a single device, a combination of devices and/or components 202a-n, 204, 206, 210a-n, 220, 222, 224, 226, 228, 240a-f, and/or a plurality of devices, as is or becomes desirable and/or practicable. Similarly, in some embodiments, one or more of the various components 202a-n, 204, 206, 210a-n, 220, 222, 224, 226, 228, 240a-f may not be needed and/or desired in the system 200.

According to some embodiments, the player devices 202a-n may be utilized to access (e.g., via the Internet 204 and/or one or more other networks not explicitly shown) content provided by the game server cluster 210. The game server cluster 210 may, for example, provide, manage, host, and/or conduct various online and/or otherwise electronic games such as online bingo, slots, poker, and/or other games of chance, skill, and/or combinations thereof. In some embodiments, the various game servers 210a-n (virtual and/or physical) of the game server cluster 210 may be configured to provide, manage, host, and/or conduct individual instances and/or sessions of available game types. A first game server 210a, for example, may host a first particular session of an online bingo game (or tournament), a second game server 210c may host a second particular session of an online bingo game (or tournament), a third game server 210c may facilitate an online poker tournament (e.g., and a corresponding plurality of game sessions that comprise the tournament), and/or a fourth game server 210d may provide an online slots game (e.g., by hosting one or more slot game sessions).

In some embodiments, the player devices 202a-n may comprise various components (hardware, firmware, and/or software; not explicitly shown) that facilitate game play and/or interaction with the game server cluster 210. The player device 202a-n may, for example, comprise a gaming client such as a software application programmed in Adobe® Flash® and/or HTML 5 that is configured to send requests to, and receive responses from, one or more of the game servers 210a-n of the game server cluster 210. In some embodiments, such an application operating on and/or via the player devices 202a-n may be configured in Model-View-Controller (MVC) architecture with a communication manager layer responsible for managing the requests to/responses from the game server cluster 210. In some embodiments, one or more of the game servers 210a-n may also or alternatively be configured in a MVC architecture with a communication manager and/or communications management layer (not explicitly shown in FIG. 2). In some embodiments, communications between the player devices 202a-n and the game server cluster 210 may be conducted in accordance with the HyperText Transfer Protocol (HTTP) version 1.1 (HTTP/1.1) as published by the Internet Engineering Taskforce (IET) and the World Wide Web Consortium (W3C) in RFC 2616 (June 1999).

According to some embodiments, communications between the player devices 202a-n and the game server cluster 210 may be managed and/or facilitated by the load balancer 206. The load balancer 206 may, for example, route communications from player devices 202a-n to one or more of the specific game servers 210a-n depending upon various attributes and/or variables such as bandwidth availability (e.g., traffic management/volumetric load balancing), server load (e.g., processing load balancing), server functionality (e.g., contextual awareness/availability), and/or player-server history (e.g., session awareness/"stickiness"). In some embodiments, the load balancer 206 may comprise one or more devices and/or services provided by a third-party (not separately shown in FIG. 2). The load balancer 206 may, for example, comprise an Elastic Load Balancer (ELB) service provided by Amazon® Web Services, LLC of Seattle, Wash. According to some embodiments, such as in the case that the load balancer 206 comprises the ELB or a similar service, the load balancer 206 may manage, set, determine, define, and/or otherwise influence the number of game servers 210a-n within the game server cluster 210. In the case that traffic and/or requests from the player devices 202a-n only require the first and second game servers 210a-b, for example, all other game servers 210c-n may be taken off-line, may not be initiated and/or called, and/or may otherwise not be required and/or utilized in the system 200. As demand increases (and/or if performance, security, and/or other issues cause one or more of the first and second game servers 210*a-b* to experience detrimental issues), the load balancer 206 may call and/or bring online one or more of the other game servers 210*c-n* depicted in FIG. 2. In the case that each game server 210*a-n* comprises an instance of an Amazon® Elastic Compute Cloud (EC2) service, the load balancer 206 may add or remove instances as is or becomes practicable and/or desirable.

In some embodiments, the load balancer 206 and/or the Internet 204 may comprise one or more proxy servers and/or devices (not shown in FIG. 2) via which communications between the player devices 202*a-n* and the game server cluster 210 are conducted and/or routed. Such proxy servers and/or devices may comprise one or more regional game hosting centers, for example, which may be geographically dispersed and addressable by player devices 202*a-n* in a given geographic proximity. In some embodiments, the proxy servers and/or devices may be located in one or more geographic areas and/or jurisdictions while the game server cluster 210 (and/or certain game servers 210*a-n* and/or groups of game servers 210*a-n* thereof) is located in a separate and/or remote geographic area and/or jurisdiction.

According to some embodiments, for specific game types such as bingo, the game server cluster 210 may provide game results (such as a full set of drawn bingo numbers and/or bonus metrics) to a controller device (not separately shown in FIG. 2) that times the release of game result information to the player devices 202*a-n* such as by utilizing a broadcaster device (also not separately shown in FIG. 2) that transmits the time-released game results to the player devices 202*a-n* (e.g., in accordance with the Transmission Control Protocol (TCP) and Internet Protocol (IP) suite of communications protocols (TCP/IP), version 4, as defined by "Transmission Control Protocol" RFC 793 and/or "Internet Protocol" RFC 791, Defense Advance Research Projects Agency (DARPA), published by the Information Sciences Institute, University of Southern California, J. Postel, ed. (September 1981)).

In some embodiments, the game server cluster 210 (and/or one or more of the game servers 210*a-n* thereof) may be in communication with the dynamic DB 240*a*. According to some embodiments, the dynamic DB 240*a* may comprise a dynamically-scalable database service such as the DyanmoDB™ service provided by Amazon® Web Services, LLC. The dynamic DB 240*a* may, for example, store information specific to one or more certain game types (e.g., poker) provided by the game server cluster 210 such as to allow, permit, and/or facilitate reporting and/or analysis of such information.

According to some embodiments, the game server cluster 210 (and/or one or more of the game servers 210*a-n* thereof) may be in communication with the cloud-based cache cluster 240*b*. Game state information from the game server cluster 210 may be stored in the game state cache 240*b*-1, for example, slot state (e.g., slot-game specific state) data may be stored in the slot state cache 240*b*-2, and/or other game and/or player information (e.g., progressive data, referral data, player rankings, audit data) may be stored in the hydra cache 240*b*-3. In some embodiments, the cache persistor 220 may move and/or copy data stored in the cloud-based cache cluster 240*b* to the non-relational DB 240*c*. The non-relational DB 240*c* may, for example, comprise a SimpleDB™ service provided by Amazon® Wed Services, LLC. According to some embodiments, the game server cluster 210 may generally access the cloud-based cache cluster 240*b* as-needed to store and/or retrieve game-related information. The data stored in the cloud-based cache cluster 240*b* may generally comprise a subset of the newest or freshest data, while the cache persistior 220 may archive and/or store or move such data to the non-relational DB 240*c* as it ages and/or becomes less relevant (e.g., once a player logs-off, once a game session and/or tournament ends). The game server cluster 210 may, in accordance with some embodiments, have access to the non-relational DB 240*c* as-needed and/or desired. The game servers 210*a-n* may, for example, be initialized with data from the non-relational DB 240*c* and/or may store and/or retrieve low frequency and/or low priority data via the non-relational DB 240*c*.

In some embodiments, the SQS device 222 may queue and/or otherwise manage requests, messages, events, and/or other tasks or calls to and/or from the server cluster 210. The SQS device 222 may, for example, prioritize and/or route requests between the game server cluster 210 and the task scheduler 224. In some embodiments, the SQS device 222 may provide mini-game and/or tournament information to the server cluster 210. According to some embodiments, the task scheduler 224 may initiate communications with the SQS device 222, the e-mail service provider 226 (e.g., providing e-mail lists), the remote DB service 240*d* (e.g., providing inserts and/or updates), and/or the persistence DB 240*e* (e.g., providing and/or updating game, player, and/or other reporting data), e.g., in accordance with one or more schedules.

According to some embodiments, the persistence DB 240*e* may comprise a data store of live environment game and/or player data. The game server cluster 210 and/or the task scheduler 224 or SQS device 222 may, for example, store game and/or player data to the persistence DB 240*e* and/or may pull and/or retrieve data from the persistence DB 240*e*, as-needed and/or desired. The server cluster 210 may, according to some embodiments, provide and/or retrieve spin and/or other game event info and/or configuration information via the persistence DB 240*e*.

In some embodiments, the reporting DB 240*f* may be created and/or populated based on the persistence DB 240*e*. On a scheduled and/or other basis, for example, a data transformation and/or mapping program may be utilized to pull data from the live environment (e.g., the persistence DB 240*e*) into the reporting DB 240*f*. The query service 228 may then be utilized, for example, to query the reporting DB 240*f*, without taxing the live environment and/or production system directly accessible by the game server cluster 210.

Figure 3:
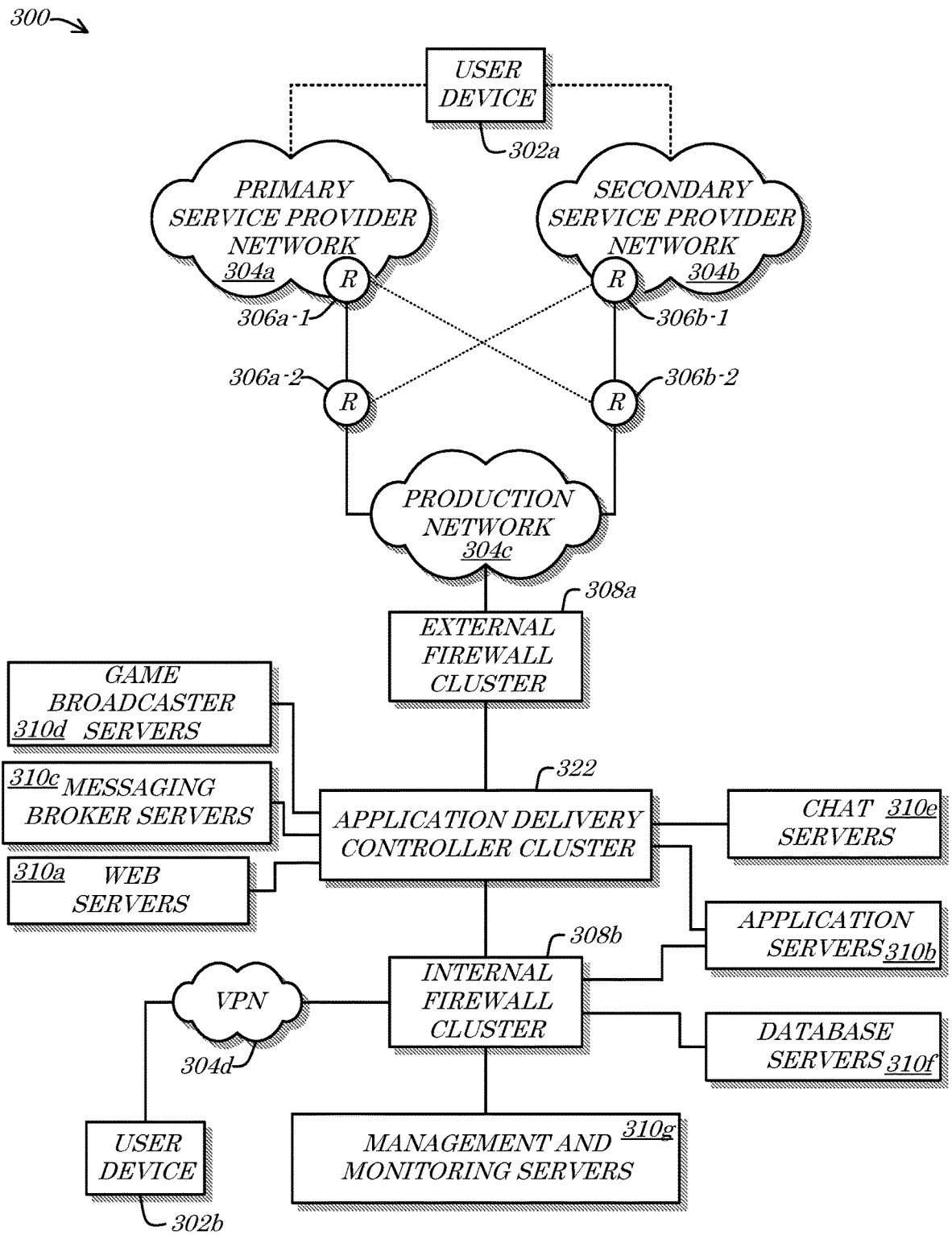
FIG. 3 is a block diagram of a system according to some embodiments.

Turning now to FIG. 3, a block diagram of a system 300 according to some embodiments is shown. In some embodiments, the system 300 may comprise and/or define a "front-end" architecture of a gaming platform such as a platform via which social, multiplayer, and/or online games may be played. In some embodiments, the system 300 may comprise a plurality of user devices 302*a-b*, a plurality of networks 304*a-b* (e.g., a primary service provider network 304*a*, a secondary service provider network 304*b*, a production network 304*c*, and/or a VPN 304*d*), a plurality of routers 306*a-b*, a plurality of firewall devices 308*a-b*, a plurality of game servers 310*a-g* (e.g., web servers 310*a*, application servers 310*b*, messaging broker servers 310*c*, game broadcaster servers 310*d*, chat servers 310*e*, database servers 310*f*, and/or management and monitoring servers 310*g*), and/or an application delivery controller cluster 322.

According to some embodiments, any or all of the components 302*a-b*, 304*a-b*, 306*a-b*, 308*a-b*, 310*a-g*, 322 of the system 300 may be similar in configuration and/or functionality to any similarly named and/or numbered components described herein. Fewer or more components 302a-b, 304a-b, 306a-b, 308a-b, 310a-g, 322 (and/or portions thereof) and/or various configurations of the components 302a-b, 304a-b, 306a-b, 308a-b, 310a-g, 322 may be included in the system 300 without deviating from the scope of embodiments described herein. While multiple instances of some components 302a-b, 304a-b, 306a-b, 308a-b, 310a-g are depicted and while single instances of other components 322 are depicted, for example, any component 302a-b, 304a-b, 306a-b, 308a-b, 310a-g, 322 depicted in the system 300 may comprise a single device, a combination of devices and/or components 302a-b, 304a-b, 306a-b, 308a-b, 310a-g, 322, and/or a plurality of devices, as is or becomes desirable and/or practicable. Similarly, in some embodiments, one or more of the various components 302a-b, 304a-b, 306a-b, 308a-b, 310a-g, 322 may not be needed and/or desired in the system 300.

In some embodiments, a first user device 304a may comprise an electronic device owned and/or operated by a player of an online game (not explicitly shown) and/or by an entity that otherwise accesses online game content and/or services externally (e.g., requiring external login and/or access credentials and/or procedures). The first user device 304a may, for example, be utilized to access content provided by and/or via the application delivery controller cluster 322. In some embodiments, the first user device 304a may interface with and/or connect to the production network 304c via the primary service provider network 304a and/or the secondary service provider network 304b. The primary service provider network 304a and the secondary service provider network 304b may, for example, load balance and/or provide redundant coverage for outage recovery by utilization of a first primary service provider network router 306a-1, a second primary service provider network router 306a-2, a first secondary service provider network router 306b-1, and/or a second secondary service provider network router 306b-2.

According to some embodiments, the application delivery controller cluster 322 may be insulated and/or protected from the production network 304c by an external firewall cluster 308a. The first user device 304a may, for example, be required to provide credentials to and/or otherwise access the application delivery controller cluster 322 via the external firewall cluster 308a.

In some embodiments, the application delivery controller cluster 322 may receive via and/or from the external firewall cluster 308a and/or the production network 304c, one or more requests, calls, transmissions, and/or commands from the first user device 304a. The first user device 304a may, for example, submit a call for an online gaming interface to the application delivery controller cluster 322. In some embodiments, the application delivery controller cluster 322 may comprise one or more hardware, software, and/or firmware devices and/or modules configured (e.g., specially-programmed) to route events and/or responses between the first user device 304a and one or more of the servers 310a-g. In the case that the first user device 304a is utilized to access an online gaming interface for example, one or more of the web servers 310a (e.g., that may provide graphical and/or rendering elements for an interface and/or other web services) and/or the application servers 310b (e.g., that may provide rule and/or logic-based programming routines, elements, and/or functions—e.g., game play engines) may be called and/or managed by the application delivery controller cluster 322.

In some embodiments, the messaging broker servers 310c may receive and/or retrieve messages from the first user device 304a (and/or from one or more of the other servers 310a-b, 310d-g) and perform one or more inter-application processes in relation thereto. The messaging broker servers 310c may, for example, route, transform, consolidate, aggregate, store, augment, and/or otherwise process one or more requests in connection with provision of online gaming services to the first user device 304a (e.g., facilitating a decoupling of services provided by various applications on and/or from the various servers 310a-b, 310d-g). According to some embodiments, the game broadcaster servers 310d may provide scheduled releases of information descriptive of an online game. The game broadcaster servers 310d may, for example, provide a broadcast feed of bingo numbers, slot and/or other random (and/or pseudo-random) number results that may be accessed by (and/or transmitted to) the first user device 304a (e.g., in connection with the play of an online bingo, slots, and/or other game for which broadcast information may be utilized). In some embodiments, the chat servers 310e may provide, manage, and/or facilitate communications between the first user device 304a (and/or first user thereof) and one or more other player/user devices (such as a second user device 302b and/or other player/user devices not shown in FIG. 3).

According to some embodiments, the second user device 304b may generally comprise an electronic device owned and/or operated by a user (not shown) closely affiliated with an entity that operates the system 300 (such entity also not shown). An employee (e.g., programmer and/or Customer Service Representative (CSR)), contractor, and/or other agent of an online gaming company may, for example, utilize the second user device 304b to interface with the privately-accessible VPN 304d. The VPN 304d may, for example, provide direct access to the application servers 310b, the database servers 310f, the management and monitoring servers 310g, and/or the application delivery controller cluster 322. In some embodiments (as depicted in FIG. 3), such access may be gated through and/or insulated or protected by an internal firewall cluster 308b. The second user device 304b may, for example, be required to provide credentials to and/or otherwise access the application delivery controller cluster 322 and/or servers 310a-g via the internal firewall cluster 308b.

In some embodiments, the database servers 310f may provide access to one or more databases and/or data stores (e.g., not shown in FIG. 3; for data storage and/or retrieval). In some embodiments, the management and monitoring servers 310g may provide services such as monitoring, reporting, troubleshooting, analysis, configuring, etc. to the second user device 304b. The second user device 304b may, for example, access the management and monitoring servers 310g and/or the database servers 310f to run reports descriptive of online gaming operations, game play, and/or game referral setup, management, and/or analysis. According to some embodiments, either or both of the user devices 304a-b in conjunction with one or more of the servers 310a-g and/or the application delivery controller cluster 322 may conduct (in whole or in part), facilitate, and/or otherwise be associated with execution of one or more stored procedures, applications, processes, and/or methods (e.g., the method 700 of FIG. 7 herein, and/or one or more portions thereof).

Utilization of the term "server" with respect to the servers 310a-g of the system 300 of FIG. 3 is meant solely to ease description of the configuration and/or functionality of the servers 310a-g. The term "server" is not intended to be limiting with respect to any particular hardware, software, firmware, and/or quantities thereof utilized to implement any or all of the servers 310a-g of the system 300. Similarly, while multiple types and/or instances of the severs 310a-g are depicted in FIG. 3, any or all of the servers 310a-g may be implemented in, on, and/or by one or multiple computer server and/or other electronic devices.

Figure 4:
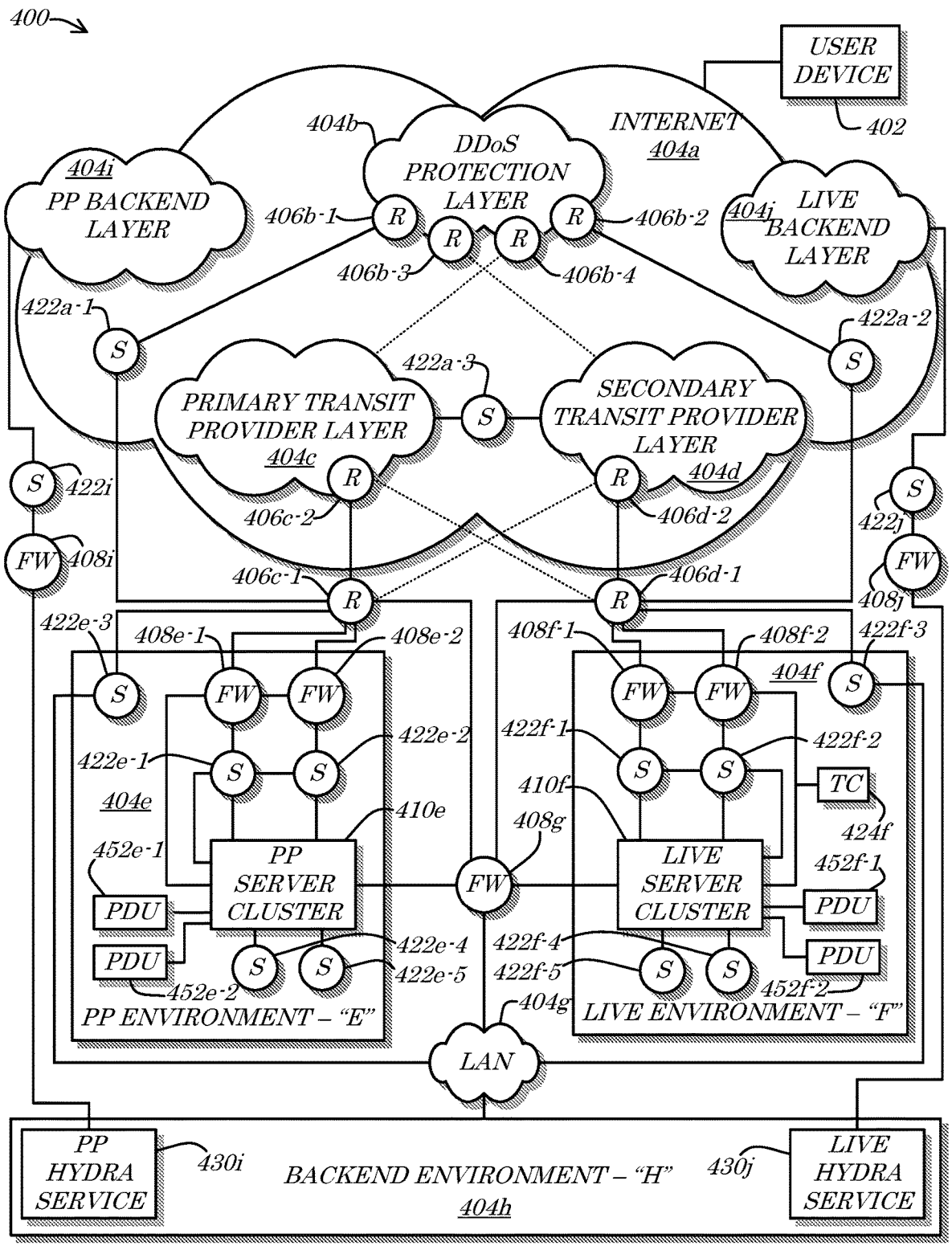
FIG. 4 is a block diagram of a system according to some embodiments.

Referring now to FIG. 4, a block diagram of a system 400 according to some embodiments is shown. In some embodiments, the system 400 may comprise and/or define a "front-end" architecture of a gaming platform such as a platform via which social, multiplayer, and/or online games may be played. The system 400 may be similar in configuration and/or functionality, for example, to the system 300 of FIG. 3 and/or one or more portions thereof. In some embodiments, the system 400 may comprise a user device 402, a plurality of networks (and/or environments and/or layers) 404a-j (e.g., the Internet 404a, a Distributed Denial-of-Service (DDoS) protection layer 404b, a primary transit provider layer 404c, a secondary transit provider layer 404d, a Pre-Production (PP) environment 404e, a live environment 404f, a LAN 404g, a backend environment 404h, a PP backend layer 404i, and/or a live backend layer 404j), a plurality of routers 406b-d, a plurality of firewall devices 408e-g, 408i-j, a plurality of servers 410e-f (e.g., a PP server cluster 410e and/or a live server cluster 410f), a plurality of switching devices 422a, 422e-f, 422i-j, a Terminal Concentrator (TC) 424f, a plurality of "hydra" services 430i-j (e.g., a PP hydra service 430i and/or a live hydra service 430j), and/or a plurality of Power Distribution Unit (PDU) devices 452e-f.

According to some embodiments, any or all of the components 402, 404a-j, 406b-d, 408e-g, 408i-j, 410e-f, 422a, 422e-f, 422i-j, 424f, 430i-j, 452e-f of the system 400 may be similar in configuration and/or functionality to any similarly named and/or numbered components described herein. Fewer or more components 402, 404a-j, 406b-d, 408e-g, 408i-j, 410e-f, 422a, 422e-f, 422i-j, 424f, 430i-j, 452e-f (and/or portions thereof) and/or various configurations of the components 402, 404a-j, 406b-d, 408e-g, 408i-j, 410e-f, 422a, 422e-f, 422i-j, 424f, 430i-j, 452e-f may be included in the system 400 without deviating from the scope of embodiments described herein. While multiple instances of some components 404a-j, 406b-d, 408e-g, 408i-j, 410e-f, 422a, 422e-f, 422i-j, 430i-j, 452e-f are depicted and while single instances of other components 402, 424f are depicted, for example, any component 402, 404a-j, 406b-d, 408e-g, 408i-j, 410e-f, 422a, 422e-f, 422i-j, 424f, 430i-j, 452e-f depicted in the system 400 may comprise a single device, a combination of devices and/or components 402, 404a-j, 406b-d, 408e-g, 408i-j, 410e-f, 422a, 422e-f, 422i-j, 424f, 430i-j, 452e-f, and/or a plurality of devices, as is or becomes desirable and/or practicable. Similarly, in some embodiments, one or more of the various components 402, 404a-j, 406b-d, 408e-g, 408i-j, 410e-f, 422a, 422e-f, 422i-j, 424f, 430i-j, 452e-f may not be needed and/or desired in the system 400.

In some embodiments, the user device 402 may be utilized to access one or more of the PP environment 404e, the live environment 404f, and/or the backend environment 404h via the Internet 404a. In some embodiments, the user device 402 may be utilized to access the backend environment 404h and/or the PP hydra service 430i via the PP backend layer 404i. A PP backend switch device 422i and/or a PP backend firewall device 408i may, for example, gate and/or control access to the backend environment 404h and/or the PP hydra service 430i, via the PP backend layer 404i. In some embodiments, the user device 402 may be utilized to access the backend environment 404h and/or the live hydra service 430j via the live backend layer 404j. A live backend switch device 422j and/or a live backend firewall device 408j may, for example, gate and/or control access to the backend environment 404h and/or the live hydra service 430j, via the live backend layer 404j.

According to some embodiments, any communications (e.g., requests, calls, and/or messages) from the user device 402 may be passed through the DDoS protection layer 404b. The DDoS protection layer 404b may, for example, monitor and/or facilitate protection against various forms of cyber attacks including, but not limited to, DDoS attacks. In some embodiments, the DDoS protection layer 404b may comprise and/or be in communication with a plurality of DDoS router devices 406b-1, 406b-2, 406b-3, 406b-4 that may be utilized to route and/or direct incoming communications (e.g., from the user device 402) to appropriate portions of the system 400.

In some embodiments, the DDoS protection layer 404b and/or a first DDoS router device 406b-1 may route communications from the user device 402 through and/or via a first switch device 422a-1 and/or to, through, and/or via a first primary transit provider router device 406c-1. In some embodiments, the first switch device 422a-1 may comprise a device utilized for security switching such as may implement communications in accordance with the Generic Routing Encapsulation (GRE) communications tunneling protocol described in RFC 2784 "Generic Routing Encapsulation (GRE)" published by the Network Working Group (NWG) in March, 2000. The first primary transit provider router device 406c-1 may, for example, provide access to the PP environment 404e and/or the PP server cluster 410e thereof, such as via one or more PP firewall devices 408e-1, 408e-2 and/or one or more PP switch devices 422e-1, 422e-2. According to some embodiments, the PP switch devices 422e-1, 422e-2 may comprise content switching devices that process and route data (e.g., in the data link layer) based on data content. In some embodiments, the first primary transit provider router device 406c-1 may direct communications to, through, and/or via a PP LAN switch device 422e-3 that provides and/or facilitates access to the LAN 404g. The LAN 404g may, for example, provide private access to and/or between the PP environment 404e, the live environment 404f, and/or the backend environment 404h. In some embodiments, the first primary transit provider router device 406c-1 and/or the PP LAN switch device 422e-3 may direct communications to, through, and/or via a LAN firewall device 408g that provides direct access to either or both of the PP server cluster 410e and the live server cluster 410f.

According to some embodiments, the DDoS protection layer 404b and/or a second DDoS router device 406b-2 may route communications from the user device 402 through and/or via a second switch device 422a-2 and/or to, through, and/or via a first secondary transit provider router device 406d-1. In some embodiments, the second switch device 422a-2 may comprise a device utilized for security switching such as may implement communications in accordance with the GRE communications tunneling protocol described in RFC 2784 "Generic Routing Encapsulation (GRE)" published by the Network Working Group (NWG) in March, 2000. The first secondary transit provider router device 406d-1 may, for example, provide access to the live environment 404f and/or the live server cluster 410f thereof, such as via one or more live firewall devices 408f-1, 408f-2 and/or one or more live switch devices 422f-1, 422f-2. According to some embodiments, the live switch devices 422f-1, 422f-2 may comprise content switching devices that process and route data (e.g., in the data link layer) based on data content. In some embodiments, the first secondary transit provider router device 406d-1 may direct communications to, through, and/or via a live LAN switch device 422f-3 that provides and/or facilitates access to the LAN 404g. In some embodiments, the first secondary transit provider router device 406d-1 and/or the live LAN switch device 422f-3 may direct communications to, through, and/or via the LAN firewall device 408g that provides direct access to either or both of the PP server cluster 410e and the live server cluster 410f.

In some embodiments, the DDoS protection layer 404b and/or one or more of a third DDoS router device 406b-3 and/or a fourth DDoS router device 406b-4 may route communications from the user device 402 through and/or via one or more of the primary transit provider layer 404c and/or the secondary transit provider layer 404d. In some embodiments, a transit provider switch device 422a-3 may direct, swap, route, and/or manage communications between the primary transit provider layer 404c and the secondary transit provider layer 404d. According to some embodiments, the transit provider switch device 422a-3 may comprise a switching device that operates in accordance with an Exterior Border Gateway Protocol (EBGP)—e.g., the transit provider switch device 422a-3 may comprise one or more edge or border routers. In some embodiments, the first primary transit provider router device 406c-1, the first secondary transit provider router device 406d-1, a second primary transit provider router device 406c-2, and/or a second secondary transit provider router device 406d-2 may be utilized to route and/or direct communications between (i) the primary transit provider layer 404c and/or the secondary transit provider layer 404d and (ii) the PP environment 404e and/or the live environment 404f.

According to some embodiments, the PP server cluster 410e and/or the PP environment 404e may comprise various hardware, software, and/or firmware that permits a user (e.g., of the user device 402) to program, edit, manage, and/or otherwise interface with PP game elements and/or interfaces (e.g., for development and/or testing purposes). In some embodiments, the PDU devices 452e-1, 452e-2 may generally provide power distribution, supply, management, backup, and/or conditioning services (e.g., to the PP server cluster 410e) as is or becomes desired. According to some embodiments, additional switch devices 422e-4, 422e-5 may be utilized to distribute, balance, manage and/or control communications to, from, and/or within the PP server cluster 410e.

In some embodiments, the live server cluster 410f and/or the live environment 404f may comprise various hardware, software, and/or firmware that permits a user (e.g., of the user device 402) to program, edit, manage, and/or otherwise interface with live game elements and/or interfaces (e.g., for troubleshooting, corrective, and/or live environment management purposes). In some embodiments, the PDU devices 452f-1, 452f-2 may generally provide power distribution, supply, management, backup, and/or conditioning services (e.g., to the live server cluster 410f) as is or becomes desired. According to some embodiments, additional switch devices 422f-4, 422f-5 may be utilized to distribute, balance, manage and/or control communications to, from, and/or within the live server cluster 410f. In some embodiments, the TC device 424f may be utilized to manage communications from a variety of data sources such as by providing communication capability between various communications channels (not separately depicted in FIG. 4).

Figure 5:
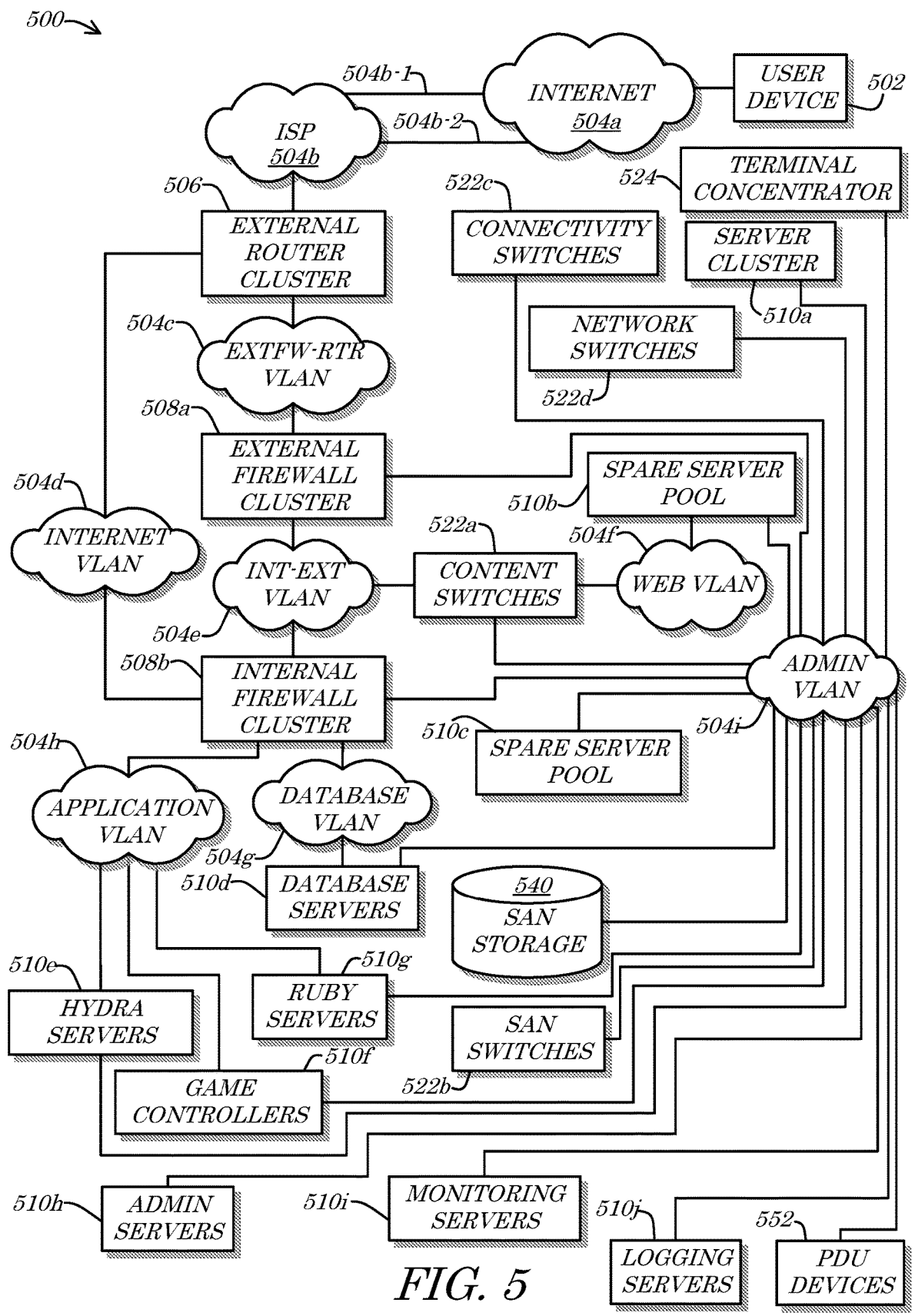
FIG. 5 is a block diagram of a system according to some embodiments.

Turning to FIG. 5, a block diagram of a system 500 according to some embodiments is shown. In some embodiments, the system 500 may comprise and/or define a "backend" architecture of a gaming platform such as a platform via which social, multiplayer, and/or online games may be played. The system 500 may be utilized in conjunction with the systems 300, 400 if FIG. 3 and/or FIG. 4 herein, for example, and/or may be similar in configuration and/or functionality to the backend environment 404h of the system 400 of FIG. 4. In some embodiments, the system 500 may comprise a user device 502, a plurality of networks (and/or environments and/or layers) 504a-i (e.g., the Internet 504a, an ISP 504b, an External Firewall-Router (EXTFW-RTR) Virtual LAN (VLAN) 504c, an Internet VLAN 504d, an Internal-External (INT-EXT) VLAN 504e, a web VLAN 504f, a database VLAN 504g, an application VLAN 504h, and/or an administrator VLAN 504i), an external router cluster 506, a plurality of firewall clusters 508a-b (e.g., an external firewall cluster 508a and/or an internal firewall cluster 508b), a plurality of servers 510a-j (e.g., a server cluster 510a, a first spare server pool 510b, a second spare server pool 510c, database servers 510d, "hydra" servers 510e, game controllers 510f, ruby servers 510g, admin servers 510h, monitoring servers 510i, and/or logging servers 510j), a plurality of switches 522a-d (e.g., content switches 522a, Storage Area Network (SAN) switches 522b, connectivity switches 522c, and/or network switches 522d), a TC device 524, a SAN storage device 540, and/or one or more PDU devices 552.

According to some embodiments, any or all of the components 502, 504a-1, 506, 508a-b, 510a-j, 522a-d, 524, 540, 552 of the system 500 may be similar in configuration and/or functionality to any similarly named and/or numbered components described herein. Fewer or more components 502, 504a-1, 506, 508a-b, 510a-j, 522a-d, 524, 540, 552 (and/or portions thereof) and/or various configurations of the components 502, 504a-1, 506, 508a-b, 510a-j, 522a-d, 524, 540, 552 may be included in the system 500 without deviating from the scope of embodiments described herein. While multiple instances of some components 504a-1, 508a-b, 510a-j, 522a-d are depicted and while single instances of other components 502, 506, 524, 540, 552 are depicted, for example, any component 502, 504a-1, 506, 508a-b, 510a-j, 522a-d, 524, 540, 552 depicted in the system 500 may comprise a single device, a combination of devices and/or components 502, 504a-1, 506, 508a-b, 510a-j, 522a-d, 524, 540, 552, and/or a plurality of devices, as is or becomes desirable and/or practicable. Similarly, in some embodiments, one or more of the various components 502, 504a-1, 506, 508a-b, 510a-j, 522a-d, 524, 540, 552 may not be needed and/or desired in the system 500.

In some embodiments, the user device 502 may be utilized to access and/or interface with one or more of the servers 510a-j via the Internet 504a. In some embodiments, the Internet 502a may be linked to the ISP 504b via multiple (e.g., redundant) connectivity paths 504b-1, 504b-2 (e.g., for load balancing, security, and/or failure recovery). According to some embodiments, the ISP 504b may be in communication with (and/or comprise) the external router cluster 506. The external router cluster 506 may route certain requests, calls, and/or transmissions (and/or users—e.g., based on credentials and/or other information) through the EXTFW-RTR VLAN 504c and/or through the external firewall cluster 508a, for example, and/or may route certain requests, calls, and/or transmissions (and/or users—e.g., based on credentials and/or other information) through the Internet VLAN 504*d* and/or through the internal firewall cluster 508*b*.

In the case that a user (not shown) of the user device 502 comprises an online game player, consumer, and/or other member of the public, for example, the external router cluster 506 may direct communications through the EXTFW-RTR VLAN 504*c* and/or through the external firewall cluster 508*a*. In the case that the user of the user device 502 comprises a programmer, tester, employee, and/or other agent of an entity that operates the system 500, for example, the external router cluster 506 may direct communications through the Internet VLAN 504*d* and/or through the internal firewall cluster 508*b*. In some embodiments, access via either or both of the external firewall cluster 508*a* and/or the internal firewall cluster 508*b* may permit the user device 502 to communicate via the INT-EXT VLAN 504*e*. The INT-EXT VLAN 504*e* may, for example, provide access to the content switches 522*a* which may, in some embodiments, serve content from any or all of the servers 510*a-j* to the user device 502, as is or becomes appropriate or desired. In some embodiments, the content switches 522*a* may communicate with the first spare server pool 510*b* via the web LAN 504*f*.

According to some embodiments, private and/or other specialized access to the system 500 via the internal firewall cluster 508*b* may permit the user device 502 to communicate via one or more of the database VLAN 504*g*, the application VLAN 504*h*, and/or the admin VLAN 504*i*. The database VLAN 504*g* may be utilized, for example, to access and/or communicate with the database servers 510*d*. In some embodiments, the application VLAN 504*h* may be utilized to access and/or communicate with any or all of the hydra servers 510*e*, the game controllers 510*f*, and/or the ruby servers 510*g*.

The admin VLAN 504*i* may allow, promote, conduct, facilitate, and/or manage a wide variety of communications within the system 500. The admin VLAN 504*i* may, for example, communicatively connect and/or couple any or all of the firewalls 508*a-b*, the servers 510*a-j*, the switches 522*a-d*, the TC device 524, the SAN storage 540, and/or the PDU devices 552. The user device 502 may be utilized, in conjunction with the admin servers 510*h* and/or via the admin VLAN 504*i* for example, to define, edit, adjust, manage, and/or otherwise access settings (and/or data) of the firewalls 508*a-b*, any or all of the switches 522*a-d*, the TC device 524, and/or the PDU devices 552. In some embodiments, the user device 502 (and/or the admin servers 510*h*) may be utilized to manage and/or access content, rules, settings, and/or performance characteristics or preferences for any or all of the servers 510*a-j*.

In some embodiments, the server cluster 510*a* may comprise one or more servers and/or other electronic controller devices (e.g., blade servers) configured to provide online gaming data (e.g., interfaces and/or results) to the user device 502. According to some embodiments, the first spare server pool 510*b* and/or the second spare server pool 510*c* may comprise one or more server and/or other electronic controller devices configured to supplement and/or replace the server cluster 510*a* as needed and/or desired (e.g., to manage load and/or error recovery situations). In some embodiments, the database servers 510*c* may provide and/or manage access to stored data such as data stored in and/or by the SAN storage device 540. In some embodiments, the hydra servers 510*e* and/or the game controllers 510*f* may provide online game information such as interfaces, results, graphics, sounds, and/or other media to the user device 502 (e.g., via the application VLAN 504*h*). In some embodiments, the ruby servers 510*g* may comprise one or more processing devices configured to provide access to one or more programming languages (e.g., "Ruby") and/or Application Programming Interface (API) mechanisms via which the servers 510*a-j* and/or other portions of the system 500 may be configured to operate (e.g., in accordance with specially and/or pre-programmed instructions written in the programming language and/or developed by the API provided by the ruby servers 510*g*). According to some embodiments, the admin servers 510*h*, the monitoring servers 510*i*, and/or the logging servers 510*j* may be utilized and/or configured to provide administrative, parameter and/or metric monitoring and/or reporting, and/or data logging and/or audit services, respectively.

V. Location-Triggered Remote Dispensing Systems—Online Gaming Examples

Figure 6A:
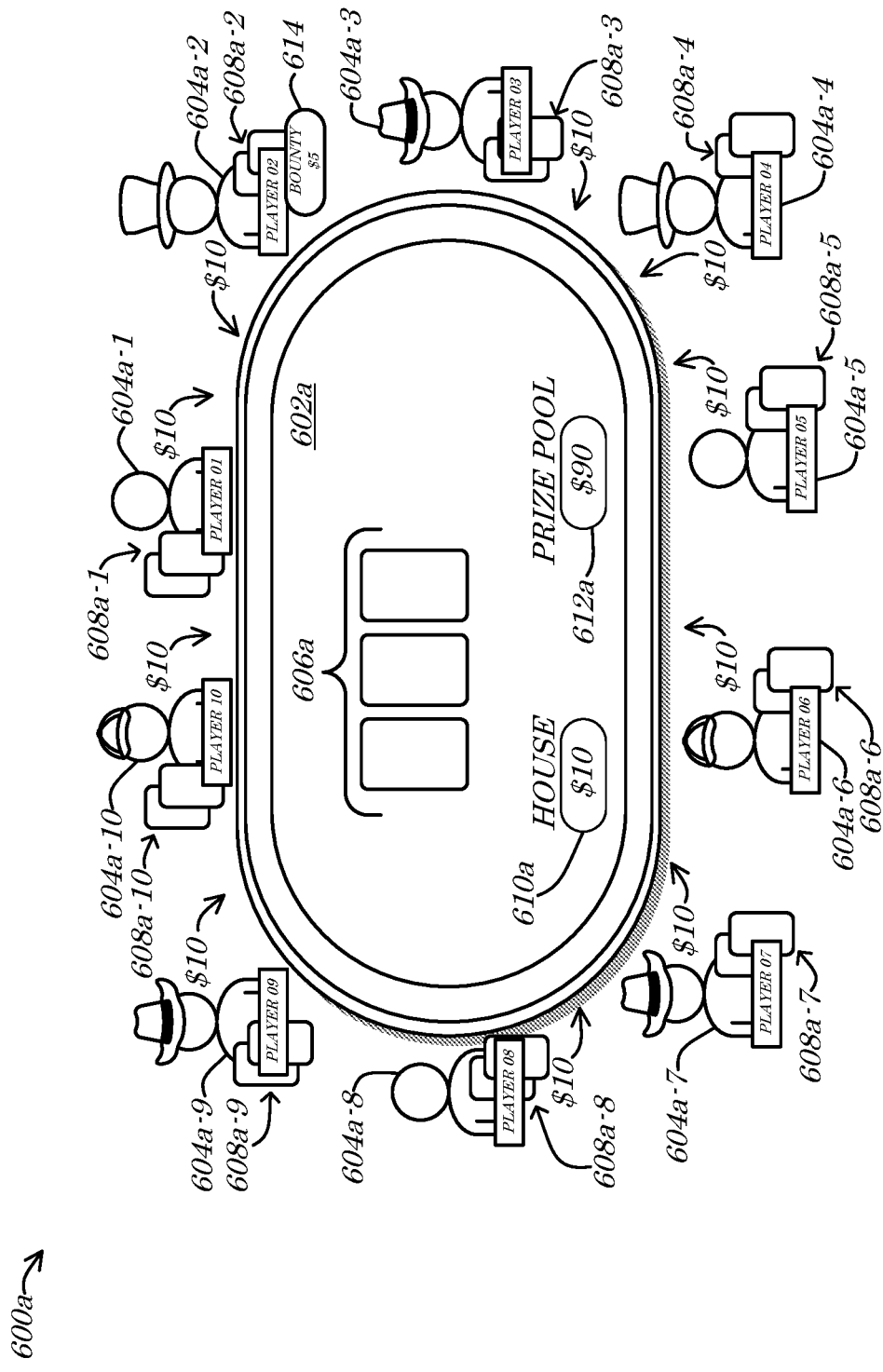
FIG. 6A is a block diagram of a prior art game system.
Figure 6B:
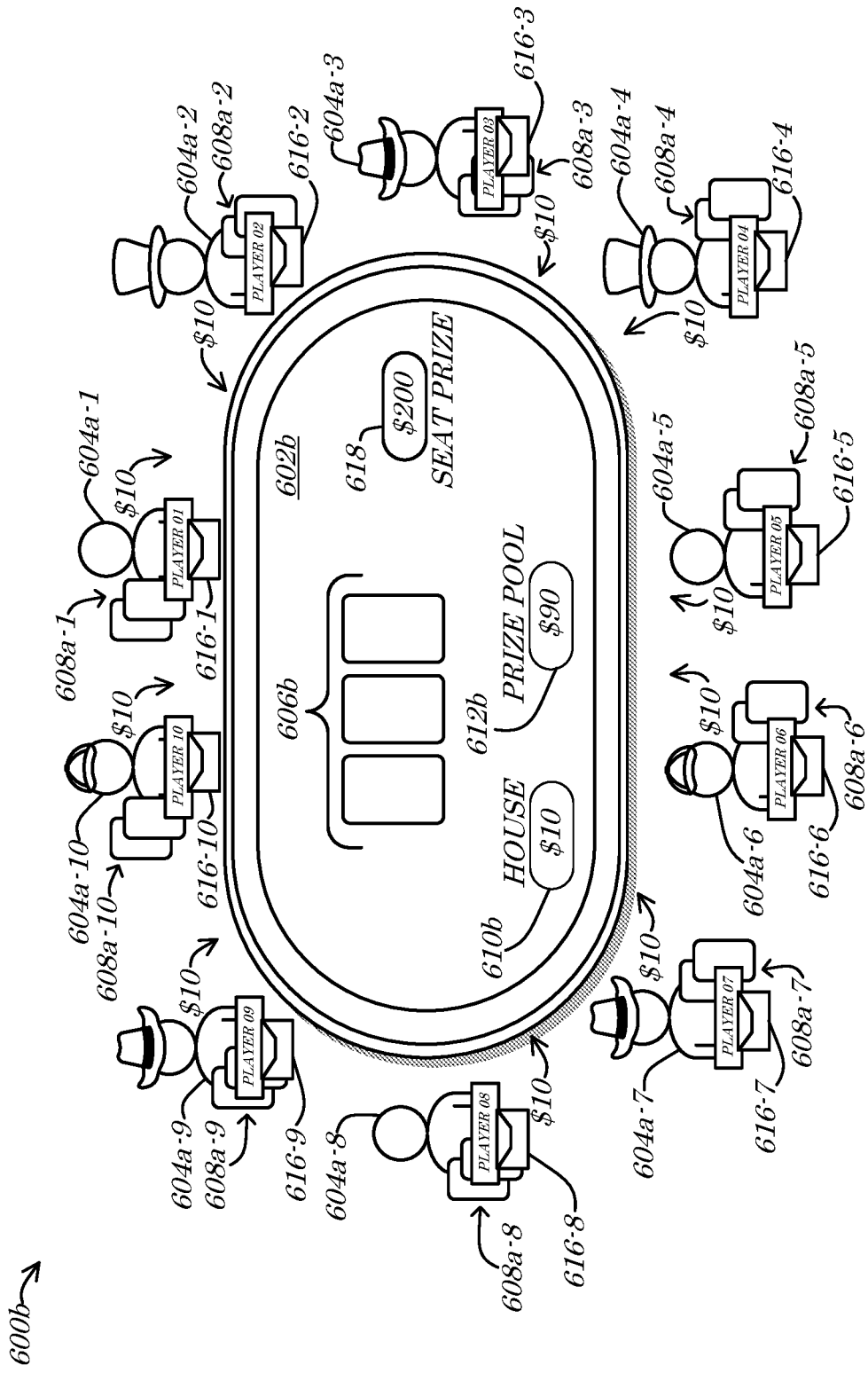
FIG. 6B is a block diagram of a game system according to some embodiments.

Referring now to FIG. 6A and FIG. 6B, a block diagram of a prior art game system 600*a* and a block diagram of a game system 600*b* according to some embodiments, are respectively shown. The prior art game system 600*a* may, for example, comprise a poker table 602*a*, a plurality of poker players 604*a*-1, 604*a*-2, 604*a*-3, 604*a*-4, 604*a*-5, 604*a*-6, 604*a*-7, 604*a*-8, 604*a*-9, 604*a*-10, one or more community cards 606*a*, a plurality of hole cards 608*a*-1, 608*a*-2, 608*a*-3, 608*a*-4, 608*a*-5, 608*a*-6, 608*a*-7, 608*a*-8, 608*a*-9, 608*a*-10, a house take 610*a*, and a prize pool 612*a*. The poker game shown as being offered and/or conducted by the prior art game system 600*a* is a "Texas hold 'em"-style poker game and is conducted in a tournament fashion for ease of illustration. In such a typical tournament game, each player 604*a*-1, 604*a*-2, 604*a*-3, 604*a*-4, 604*a*-5, 604*a*-6, 604*a*-7, 604*a*-8, 604*a*-9, 604*a*-10 provides a buy-in amount of, for example, ten dollars ($10)—as depicted. For ease of illustration, the prior art game system 600*a* includes ten (10) players 604*a*-1, 604*a*-2, 604*a*-3, 604*a*-4, 604*a*-5, 604*a*-6, 604*a*-7, 604*a*-8, 604*a*-9, 604*a*-10, each buying-in at ten dollars ($10), which yields a total buy-in amount of one hundred dollars ($100). Typically, the "house" (e.g., the entity operating and/or providing the game) retains a portion of the total buy-in such as ten percent (10%) or one dollar ($1) per player 604*a*-1, 604*a*-2, 604*a*-3, 604*a*-4, 604*a*-5, 604*a*-6, 604*a*-7, 604*a*-8, 604*a*-9, 604*a*-10-which defines the house take 610*a*. The remainder of the total buy-in amount defines the prize pool 612*a*. In such a typical poker tournament, the rules of poker (or any particular variant or other game being implemented by the prior art game system 600*a*) may be implemented to resolve each player's "hand" of cards (which comprises each of ten (10) different combinations of the community cards 606*a* and each player's hold card(s) 608*a*-1, 608*a*-2, 608*a*-3, 608*a*-4, 608*a*-5, 608*a*-6, 608*a*-7, 608*a*-8, 608*a*-9, 608*a*-10) to determine player rankings.

Typically, the first-place ranked player may receive either the entire prize pool 612*a* (i.e., ninety dollars ($90)) or a predefined first portion thereof (e.g., one hundred percent (100%) in the case that only first-place prizes are awarded). In cases where second and/or third ranked players also receive awards, they may be awarded second and third portions of the prize pool, respectively, which would typically be progressively smaller portions (e.g., first place gets sixty dollars ($60), second place gets twenty dollars ($20), and third place gets ten dollars ($10)). Player rankings may be determined in other standard manners such as by determining a reverse chronological order of player loss events (e.g., a reverse order in which players have folded, busted, or are otherwise removed from tournament play may define the player rankings or standings) across one or more hands, sessions, or rounds of play. In some cases, a bounty 614 may also be offered. The bounty 614 may, for example, comprise an amount from the house take 610a that will be additionally awarded to a player that defeats the player to which the bounty has been attached (e.g., a second player 604a-2 as depicted). In other words, every other player 604a-1, 604a-3, 604a-4, 604a-5, 604a-6, 604a-7, 604a-8, 604a-9, 604a-10 except for the second player 604a-2 is eligible to win the bounty 614. Such a bounty 614 (both a magnitude thereof and an assignment to a player 604a-1, 604a-2, 604a-3, 604a-4, 604a-5, 604a-6, 604a-7, 604a-8, 604a-9, 604a-10) is typically chosen by the "house" to make the game more exciting.

According to some embodiments, the game system 600b may comprise a game table 602b, a plurality of player positions 604b-1, 604b-2, 604b-3, 604b-4, 604b-5, 604b-6, 604b-7, 604b-8, 604b-9, 604b-10, one or more community cards 606b, a plurality of hole cards 608b-1, 608b-2, 608b-3, 608b-4, 608b-5, 608b-6, 608b-7, 608b-8, 608b-9, 608b-10, a house take 610b, a merit-based prize pool 612b, a plurality of seat prizes 616-1, 616-2, 616-3, 616-4, 616-5, 616-6, 616-7, 616-8, 616-9, 616-10, and/or an awarded seat prize 618. Many of the elements of the game system 600b may be similar to those similarly-named and/or numbered elements of the prior art game system 600a and/or the particular game being conducted may be a similar type, variant, style, and/or implementation of game (such as a "Texas hold 'em" poker tournament-style game as depicted). While a particular game type is depicted for ease of illustration and comparison in FIG. 6A and FIG. 6B, other types, variants, configurations, and/or implementations of various games (e.g., slots, roulette, craps, bingo, etc.) may be provided by the game system 600b without deviating from the scope of some embodiments. While the seat prizes 616-1, 616-2, 616-3, 616-4, 616-5, 616-6, 616-7, 616-8, 616-9, 616-10 are depicted as being uniformly distributed to each player position 604b-1, 604b-2, 604b-3, 604b-4, 604b-5, 604b-6, 604b-7, 604b-8, 604b-9, 604b-10 of the poker game, for example, in some embodiments seat prizes 616-1, 616-2, 616-3, 616-4, 616-5, 616-6, 616-7, 616-8, 616-9, 616-10 may be provided, allocated, and/or distributed in a non-uniform manner and/or may be distributed to players, positions, seats, accounts associated with play of various other games and/or with respect to seating positions and/or locations at one or more particular venues (e.g., any "seat" in a casino (virtual or real) regardless of game type being played). In some embodiments, the game system 600b may be facilitated, implemented, and/or effectuated by one or more of the systems 100, 200, 300, 400, 500 of FIG. 1, FIG. 2, FIG. 3, FIG. 4, and/or FIG. 5, and/or one or more components, portions, and/or combinations thereof.

In some embodiments, the seat prizes 616-1, 616-2, 616-3, 616-4, 616-5, 616-6, 616-7, 616-8, 616-9, 616-10 may comprise shares of the merit-based prize pool 612b that are allocated to the player positions 604b-1, 604b-2, 604b-3, 604b-4, 604b-5, 604b-6, 604b-7, 604b-8, 604b-9, 604b-10, as shown. Instead of a fixed and/or standard prize being available to the first-place winner of the poker game, for example, each individual player (not explicitly shown separate from the various player positions 604b-1, 604b-2, 604b-3, 604b-4, 604b-5, 604b-6, 604b-7, 604b-8, 604b-9, 604b-10) that may achieve a winning outcome in the game may be awarded a portion of the merit-based prize pool 612b that corresponds to their respective seat prize 616-1, 616-2, 616-3, 616-4, 616-5, 616-6, 616-7, 616-8, 616-9, 616-10. In the case that a first player associated with a first player position 604b-1 is determined to be a first-place winner of the poker game, for example, instead of being awarded the entire merit-based prize pool 612b of ninety dollars ($90), a first seat prize 616-1 allocated or assigned to the first player position 604b-1 may indicate that the first-place winner should receive twenty percent (20%) of the merit-based prize pool 612b or perhaps one hundred and ten percent (110%) of the merit-based prize pool 612b-with any amounts over the total merit-based prize pool 612b amount being supplied from the house take 610b and/or from external funds (e.g., marketing funds and/or third-party sponsors). Such variable results of the game may provide increased excitement and/or enjoyment for the players, providing an advantage and distinction to the gaming entity that conducts and/or facilitates a game with such a feature (e.g., via a central gaming server and/or device, such as in the case of online social or wagering games).

According to some embodiments, instead of the seat prizes 616-1, 616-2, 616-3, 616-4, 616-5, 616-6, 616-7, 616-8, 616-9, 616-10 comprising shares of the merit-based prize pool 612b, the seat prizes 616-1, 616-2, 616-3, 616-4, 616-5, 616-6, 616-7, 616-8, 616-9, 616-10 may comprise prizes separate from the merit-based prize pool 612b. The seat prizes 616-1, 616-2, 616-3, 616-4, 616-5, 616-6, 616-7, 616-8, 616-9, 616-10 may, for example, comprise monetary prize amounts (or other prizes having cash-equivalent monetary values) that are selected from a pool or set of available prizes and/or prize funds that are separate from the merit-based prize pool 612b. In some embodiments, a winning player may be awarded both a "merit-based" prize for having achieved a winning outcome in accordance with game play rules, as well as one or more of the seat prizes 616-1, 616-2, 616-3, 616-4, 616-5, 616-6, 616-7, 616-8, 616-9, 616-10. In such a manner, for example, such as in the case that multiple winning players are awarded "merit-based" as well as "seat"-based prize amounts, players with lower-ranked "merit-based" standings (and accordingly lower-value "merit-based" prizes) may actually win more than players with higher-ranked "merit-based" standings.

In the case that the first player associated with the first player position 604b-1 places first in the poker game (in accordance with poker game and/or tournament rules) and a second player associated with a second player position 604b-2 places second in the poker game (in accordance with poker game and/or tournament rules), for example, the first-place player (or first-place winner) may be awarded a first-place "merit-based" prize of seventy dollars ($70) and the second-place player (or second-place winner) may be awarded a second-place "merit-based" prize of twenty dollars ($20)—e.g., a full distribution of the total merit-based prize pool 612b. In addition, the first-place player (or first-place winner) may be awarded a first seat prize 616-1 of, for example, zero dollars ($0), and the second-place player (or second-place winner) may be awarded a second seat prize 616-2 of, for example, two hundred dollars ($200)—e.g., equivalent to the awarded seat prize 618 depicted in FIG. 6B. In such an embodiment and in such a case, the second-place player (or second-place winner) may actually win more (e.g., the second-place "merit-based" prize of twenty dollars ($20) plus the second seat prize 616-2 of two hundred dollars ($200); a total of two hundred and twenty dollars ($220)) than the first-place player (or first-place winner) is awarded (e.g., the first-place "merit-based" prize of seventy dollars ($70) plus the first seat prize 616-1 of zero dollars ($0); a total of seventy dollars ($70)). Such variable results of the game may provide increased excitement and/or enjoyment for the players, providing an advantage and distinction to the gaming entity that conducts and/or facilitates a game with such a feature (e.g., via a central gaming server and/or device, such as in the case of online social or wagering games).

The awarding of prizes pursuant to operation of the game systems 600*a-b* may, in some embodiments, be conducted in typical known manners (e.g., activation of a Ticket-In-Ticket-Out (TITO) device of a slot machine or other dedicated gaming machine). In accordance with some embodiments herein however, awards may be provided by remote location-triggered dispensing device activation as described herein. In typical gaming systems such as the prior art game system 600*a* of FIG. 6A, awards may be provided in one of two predominant manners. First, in the case of a live dealer game, when a particular player 604*a* earns or wins an award pursuant to a game result, the dealer (not shown) would simply hand the award to the player 604*a*. Second, in the case of an electronic game, such as an online poker game, an electronic identifier of the player 604*a* would be stored in association with the award and a database record indicative of an amount of credits owned by the player 604*a* would be accordingly updated.

In embodiments herein however, the particular location of the player 604*a* may be utilized to govern and/or trigger activation of a dispensing device (e.g., the dispensing device 160 of FIG. 1) to provide the award (e.g., directly) to the player 604*a*. The "actual location" of the player may be utilized, for example, and may comprise a mailing address, a geo-spatial coordinate (e.g., Global Positioning System (GPS) coordinate, latitude and longitude coordinate, etc.), a seating location (e.g., a physical seat identifier), etc. In some embodiments, the "virtual location" of the player may be utilized and may comprise, for example, an assigned player seat (a virtual seat) or player position in a game (e.g., "player #1"), a position of the player relative to other players (e.g., a player rank on a leaderboard), a game session identifier, virtual game room or table identifier, and/or a player's location in a virtual environment (e.g., a coordinate, stage, and/or room in a virtual world or area). In such a manner, for example, awarded monetary value may be provided to the player based on the player's location, position, seat, etc.

Providing and/or dispensing awards based on location triggers may, in some embodiments, enhance system operations. In some embodiments, once an award is dispensed, there may be no need or desire to maintain memory storage allocated for the relation of the award to the player, which may substantially reduce memory overhead such as in the case that an online gaming system would normally need to track such data for thousands of players simultaneously. In some embodiments, the location-based awarding may also or alternatively solve player privacy issues by abstracting the award to the player's location, as opposed to the player's identifier, which may also free up memory resources and/or allow for generalized or location-based reporting of awards, without compromising anonymity of the player.

VI. Location-Triggered Remote Dispensing Processes

Figure 7:
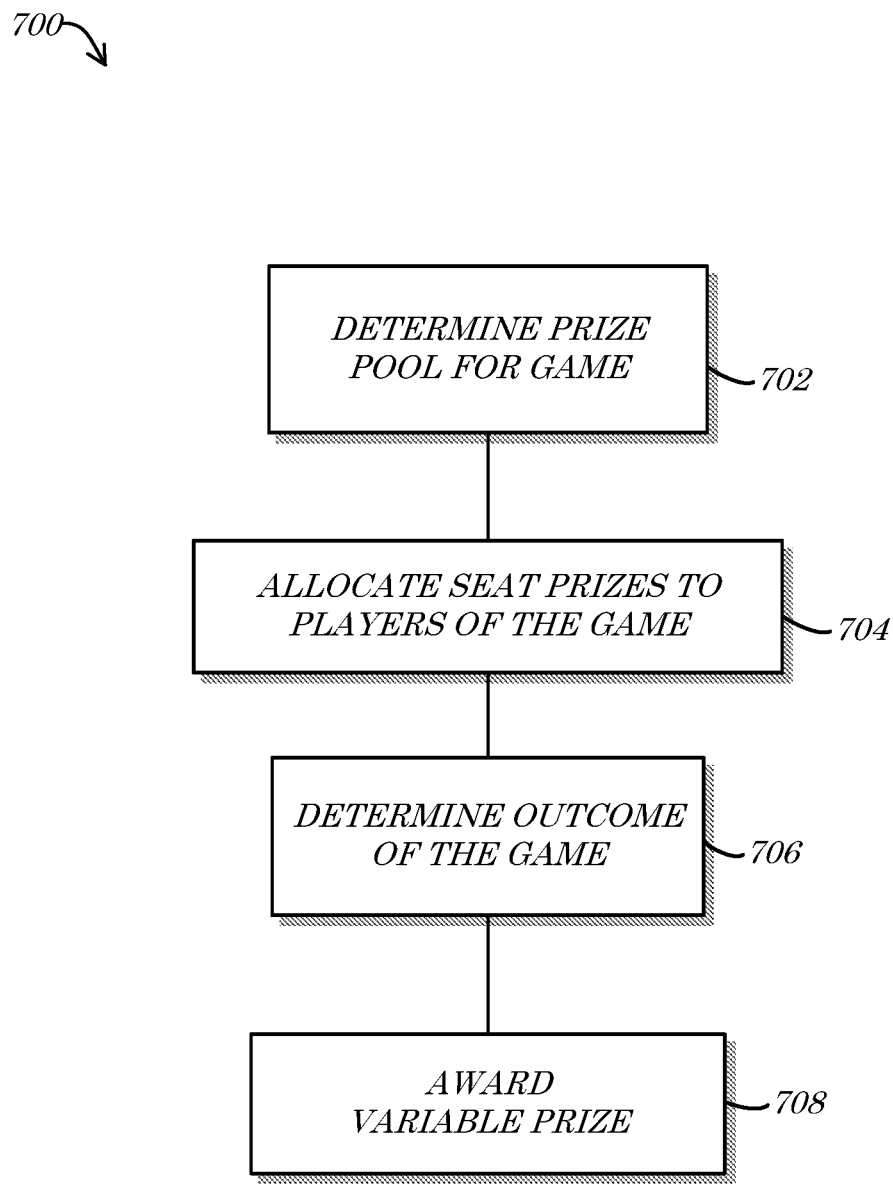
FIG. 7 is a flow diagram of a method according to some embodiments.

Referring now to FIG. 7, a flow diagram of a method 700 according to some embodiments is shown. In some embodiments, the method 700 may be performed and/or implemented by and/or otherwise associated with one or more specialized and/or computerized processing devices (e.g., the location/player and/or user devices 102*a-n*, 202*a-n*, 302*a-b*, 402, 502 and/or the servers and/or controller devices 110, 210*a-n*, 310*a-g*, 410*e-f*, 510*a-j* of FIG. 1, FIG. 2, FIG. 3, FIG. 4, and/or FIG. 5 herein), specialized computers, computer terminals, computer servers, computer systems and/or networks, and/or any combinations thereof (e.g., by one or more online gaming company and/or online gaming player processing devices). In some embodiments, the method 700 may be embodied in, facilitated by, and/or otherwise associated with various input mechanisms and/or interfaces. In some embodiments, the method 700 may be implemented in conjunction and/or association with the game system 600*b* of FIG. 6B herein.

The process and/or flow diagrams described herein do not necessarily imply a fixed order to any depicted actions, steps, and/or procedures, and embodiments may generally be performed in any order that is practicable unless otherwise and specifically noted. While generally not limiting with respect to order and/or timing, in some embodiments, the presented methods and processes may be specifically limited to and/or structured in accordance with any depicted and/or described order, hierarchy, timing, etc. Any of the processes and/or methods described herein may be performed and/or facilitated by hardware, software (including microcode), firmware, or any combination thereof. For example, a storage medium (e.g., a hard disk, Universal Serial Bus (USB) mass storage device, and/or Digital Video Disk (DVD)) may store thereon instructions that when executed by a machine (such as a computerized processing device) result in performance according to any one or more of the embodiments described herein.

In some embodiments, the method 700 may comprise determining (e.g., by a central server device) a prize pool for a game, at 702. The prize pool may, for example, be calculated and/or defined based on value provided by a plurality of players of the game. Each player of the game may, for example, contribute funds to participate in the game—e.g., a "buy-in" or "ante". In poker-style games, two typical pay formats are common. Standard wager play, for example, typically involves players posting an "ante" or primary wager to initiate or participate in a session or "hand". Additional wagers are also typically added to the "pool" at different stages of the poker session. In tournament-style play, each player may post a "buy-in" amount for play of the session, but additional wagers are not typically added to the pool—wagered chips in the game typically determine player standing or rank in tournament play, as opposed to representing real monetary value. According to some embodiments, any funds or value provided by the plurality of players of the game (e.g., an online poker, slots, craps, bingo, and/or other game) may be aggregated to define a total buy-in amount or total revenue amount for the session. In some embodiments, a house take, cut, commission, or other portion may be removed from the total-buy in/total revenue amount.

A gaming operator and/or entity that conducts, manages, and/or facilitates play of the game, for example, may take a fixed dollar or percentage amount from the total buy-in/total revenue amount—e.g., to cover operating expenses and/or to make a profit. The remainder of the total buy-in/revenue may be defined as the "prize pool". The prize pool, for example, may comprise the total buy-in/revenue amount minus the house take. In other words, a portion of the total buy-in/revenue amount may be allocated to the prize pool. As an example, and referring back to FIG. 6B, the total buy-in is one hundred dollars ($100; ten dollars ($10) for each of ten (10) players), the house take is ten dollars ($10; or one dollar ($1) from each of the ten dollar ($10) buy-ins of the ten (10) players), and the prize pool is ninety dollars ($90; the total buy-in of one hundred dollars ($100) minus the house take of ten dollars ($10)). In some embodiments, the house take itself may be calculated, identified, looked-up, and/or otherwise determined. In the case that the house take is variable, for example, one or more stored rules and/or equations may be utilized to determine how much value to deduct from the total buy-in/revenue amount. In some embodiments, the total revenue amount may not entirely comprise value provided and/or posted by players. According to some embodiments for example, some or all of the revenue amount and/or prize pool may be derived from one or more other sources (e.g., sponsors, marketing budgets, etc.). In some embodiments, indications of the individual and/or total buy-in amounts, sources of the total revenue amount, and/or an indication of the prize pool and/or house take amounts may be received, such as buy a server device that operates, conducts, processes, executes, manages, and/or facilitates the game. In the case that the game comprises an online wagering game, for example, a game server may receive and/or collect buy-in amount signals from a plurality of mobile electronic devices utilized by the various players to interface with the game server.

According to some embodiments, the method 700 may comprise allocating (e.g., by the central server device) seat prizes to players of the game, at 704. One or more values, prizes, and/or random numbers or probabilities may, for example, be assigned and/or allocated to the plurality of players of the game and/or a plurality of seats or positions of the players in the game (real or virtual seats or positions). One prize structure may be selected (e.g., randomly or otherwise) from a plurality of available prize structures, for example, and the seat prizes may be allocated in accordance with the selected prize structure. The plurality of prize structures may comprise, for example, a first prize structure comprising a first set of ten (10) prizes (e.g., a first prize of ten thousand dollars ($10,000), a second prize of four thousand dollars ($4,000), a third prize of one thousand dollars ($1,000), a fourth prize of four hundred dollars ($400), a fifth prize of four hundred dollars ($400), a sixth prize of four hundred dollars ($400), a seventh prize of two hundred dollars ($200), an eighth prize of forty dollars ($40), a ninth prize of forty dollars ($40), and a tenth prize of twenty dollars ($20)) and a second prize structure comprising a second set of ten (10) prizes (e.g., a first prize of one hundred dollars ($100), a second prize of forty dollars ($40), a third prize of twenty dollars ($20), a fourth prize of twenty dollars ($20), a fifth prize of twenty dollars ($20), a sixth prize of ten dollars ($10), a seventh prize of ten dollars ($10), an eighth prize of ten dollars ($10), a ninth prize of ten dollars ($10), and a tenth prize of ten dollars ($10)). In some embodiments, the various seat prizes may represent various shares of the prize pool.

According to some embodiments, the first prize structure may be associated with a four percent (4%) probability of occurrence and the second prize structure may be associated with a ninety-six percent (96%) probability of occurrence. One of the plurality of available seat prize structures may be chosen randomly, for example, in accordance with a probability or "payout" table that is mathematically structured to result in a selection of any particular payout structure in accordance with an assigned probability. Once the prize structure is chosen, selected, and/or otherwise determined, the various prizes defined by the prize structure may be allocated to the players, player positions or seats, and/or player devices. Allocation of the seat prizes may, for example, be conducted randomly, based on player attributes (e.g., demographics, game play history, location), based on seat/position attributes (e.g., seat/position location (real, virtual, or relative), seat game play history), in a round-robin fashion, and/or based on current game play metrics (e.g., the allocation may occur during game play based on current game play parameters, status, achievements, etc., for one or more particular players and/or for the game as a whole). According to some embodiments, the allocating of seat prizes may be conducted prior to initiation of game play.

According to some embodiments, the seat prizes or "shares" of the prize pool may be undisclosed. The prize structure chosen and/or applicable to the game session may not be revealed to the players, for example, or the prize structure may be revealed or made known, but the allocation of the shares to the players/player seats/positions/player devices may not be made known. In some embodiments, individual allocated shares may be revealed to certain players at certain times. Prior to game initiation or play, for example, each player in some embodiments may be made aware of (e.g., an indication may be transmitted to devices associated with) their respective share of the prize pool. According to some embodiments, shares may only be revealed upon a player folding or otherwise withdrawing or exiting from the game (e.g., to show them what the 'could' have won). In some embodiments, players may be made aware of every other player's share, but their own share may be kept secret (e.g., until they fold or win).

In some embodiments, the method 700 may comprise determining (e.g., by the central server device) an outcome of the game, at 706. Various rules that define how game play should progress and/or be resolved, for example, may be utilized and/or applied to determine one or more "merit-based" outcomes of the game. In the example of poker (continued for ease of illustration herein), rules defining a hierarchy of poker hands may be consulted with respect to current poker hands held by players participating in the game to determine a hierarchy of the players with respect to game play. In some embodiments, a highest-ranked hand may cause the associated player to be designated as the winning player or a first-place winner. According to some embodiments, other ranks may also be determined. A second-ranked hand may belong to a second-place winner, for example, and/or a third-ranked hand may belong to a third-place winner. In some embodiments, games other than poker may also or alternatively be provided (in accordance with variable game results as described herein). In some embodiments, the determining of the outcome(s) of the game may occur and/or be conducted after (or even at least partially in response to) the allocating of the seat prizes at 704.

According to some embodiments, the method 700 may comprise awarding (e.g., by the central server device) a variable prize, at 708; e.g., in accordance with the location-triggered remote dispensing embodiments described herein. One or more results of the game may, for example, be variable in nature. In some embodiments, a primary, standard, or first result of the game may be provided and may be based on the outcome(s) of the game determined at 706. In the case of a poker game, for example, the player with the winning hand may be designated the first-place winner and may receive a first-place prize based on the first-place outcome. In some embodiments, such a result/prize based on the outcome of the game itself may be referred to as a "merit-based" result or prize. In other words, the first result/prize may be awarded due to the "merits" of the player's game play. The term "merit" is used for convenience and should be equally applicable to games of skill, games of chance, and/or combinations thereof. According to some embodiments, the first prize/result may be determined and/or selected based on a first or primary paytable. The first or primary paytable of a poker game may, for example, require that the first-place winner be awarded the entire prize pool. In some embodiments, such as in the case that multiple ranked players receive prizes in accordance with the first paytable, the first-place winner may be designated to receive seventy percent (70%) of the prize pool, for example, and/or a second-place winner may be designated to receive twenty percent (20%) of the prize pool, and/or a third-place winner may be designated to receive ten percent (10%) of the prize pool.

In some embodiments, a secondary and/or second result of the game may also be provided. The second result may, for example, be based on the shares or "seat prizes" allocated at 704. In other words, the second result may be provided based on a second paytable. For example, a third player in a particular seat or position (real or virtual) may be awarded two hundred dollars ($200) as a result of the allocating. According to some embodiments, the second result may only be provided to a winning player. A player such as the first-place winner, based on the outcome(s) determined at 706 for example, may receive or be awarded not only the first or "merit-based" result, but may also be awarded the second or "seat prize" result. In some embodiments, second and/or third place winners may also (or alternatively) receive second results. In such a manner, for example, and based on the allocating of the shares/seat prizes, a second or third-place winner may actually be awarded more than the first-place winner. Referring back to FIG. 6B, for example, a first player 604a-1 may place first in the poker game based on applicable poker-style game rules and accordingly be designated as the first-place winner and be awarded a first result of seventy dollars ($70) while a sixth player 604a-6 may place second based on the rules and accordingly be designated as the second-place winner and be awarded a first result of twenty dollars ($20). Each such player 604a-1, 604a-6 may also, in some embodiments, be awarded a seat prize based on randomly allocated seat-based values. Continuing the example, the first player 604a-1 may receive a second result of ten dollars ($10; for a total award of eight dollars ($80)) while the sixth player 604a-6 may receive a second result of one hundred dollars ($100; for a total award of one hundred and twenty dollars ($120))—e.g., the second results comprising portions of the awarded seat prize 618 (e.g., in some embodiments, a seat prize "pool", that may be funded from monies not derived from wagers or buy-ins).

According to some embodiments, separate first and second results may not be provided. Instead, for example, a single result provided to one or more winning players may be based on the seat prize/prize pool shares allocation. Instead of the first-place winner receiving a fixed result/prize of, for example, one hundred percent (100%) of the prize pool (i.e., winner-take-all), the first-place result may be determined based on a randomly allocated share of the prize pool assigned to the player, the player's seat or position, and/or the player's electronic device utilized to play the game. In such a manner, for example, the first-place winner may be awarded a prize equivalent to a ten percent (10%) share of the prize pool, while a second-place winner may be awarded, for example, a thirty percent (30%) share of the prize pool—dependent upon what "seat" or position the players are in or what devices they are utilizing to play the game.

In some embodiments, in the case that multiple places in the winning ranks are paid positions, the values of any applicable prize structure may be halved in relation to what they otherwise would be in the case that only the first-place winner is awarded based on seat-based prize allocations.

According to some embodiments, a scheduled multi-table poker tournament may be implemented by allocating a first half of the prize pool to a regular tournament prize structure per table, while a second half of the prize pool may be allocated to providing seat-based prizes at the final table in the tournament. Players at the final table may, for example, be awarded first results based on their finishing position in the tournament, while the first-place winner of the tournament may receive the appropriate first result for the first-place win, along with a second result defined by any seat prize allocated to the winning player's seat, position, and/or device.

Figure 8:
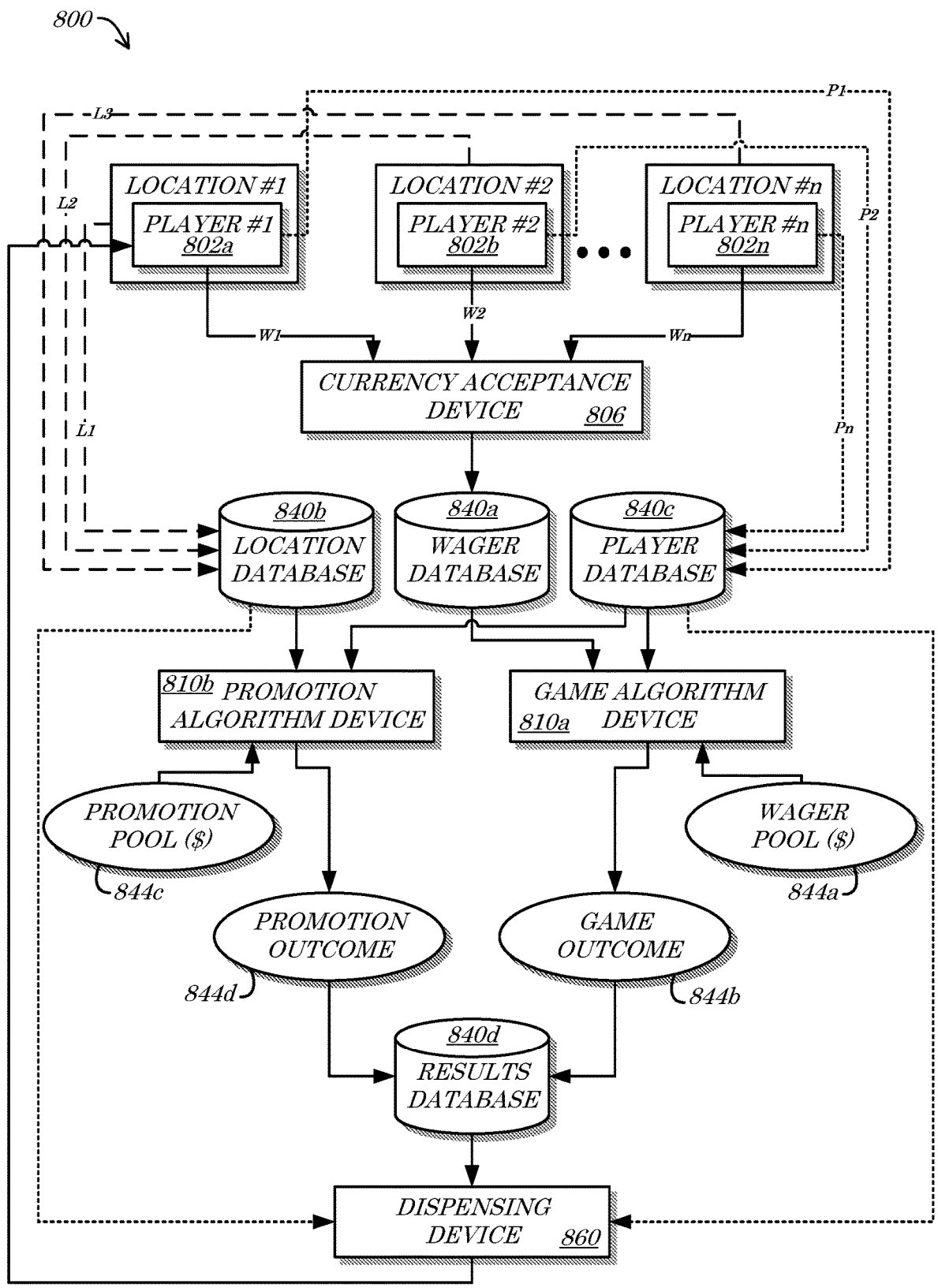
FIG. 8 is a flow diagram of system operations according to some embodiments.

Referring now to FIG. 8, a flow diagram of a system operations 800 according to some embodiments is shown. In some embodiments, the system operations 800 may be implemented in conjunction and/or association with the game system 600b of FIG. 6B herein—e.g., thereby effectuating provision of variable game result awards via location-triggered remote dispensing device activation, as described herein.

According to some embodiments, the system operations 800 may comprise actions or activities undertaken by a plurality of players 802a-n, each player 802a-n disposed at or assigned to a particular location (e.g., a physical and/or virtual location; e.g., "Location #1, "Location #2", and "Location #3", respectively). In some embodiments, such as in the case that the players 802a-n participate in an online wagering game, each player 802a-n may indicate, define, and/or provide a wager to a currency acceptance device 806 (e.g., first, second, and third wagers, respectively, as indicated by "W1", "W2", and "W3", respectively). The currency acceptance device 806 may comprise any type, configuration, and/or quantity of devices and/or objects capable of receiving, identifying, allocating, and/or processing wager payments from the player 802a-n. The currency acceptance device 806 may comprise, for example, a currency validation device such as a one or more banknote, credit card, payment card, and/or coin acceptance devices that utilize computer-assisted optical scanning, magnetic scanning, and/or physical characteristic detection mechanisms, such as devices manufactured by Crane Payment Innovations (CPI) of Malvern, Pa. or Japan Cash Machine, Co. Ltd. (JPM), such as through JPM American Corporation of Las Vegas, Nev.

In some embodiments, information related to the wagers may also be received and/or utilized. Information descriptive of the locations of the players 804a-n (e.g., "L1", "L2", and "L3", respectively) and/or information descriptive of and/or identifying the players 804a-n (e.g., "P1", "P2", and "P3", respectively) may, for example, be received and/or identified. According to some embodiments, one or more algorithm devices 810a-b (e.g., computer servers, computer cores, threads, and/or micro-engines) may execute a plurality of algorithms (e.g., formulas and/or applied rules or logic) utilizing any or all of the received wager, location, and player information as inputs.

In some embodiments, the information related to the wagers may also be stored in the one or more databases 840a-d. Information descriptive of the locations of the players 804a-n (e.g., "L1", "L2", and "L3", respectively) may be stored in a location (or second) database 840b, for example, and/or information descriptive of and/or identifying the players 804a-n (e.g., "P1", "P2", and "P3", respectively) may be stored in a player (or third) database 840c.

According to some embodiments, the one or more algorithm devices 810a-b may retrieve any or all of the stored data to execute one or more stored and/or pre-defined algorithms, calculations, formulas, and/or logic operations. A first or game algorithm device 810a may, for example, execute and/or implement an online game such as an online wagering game. In some embodiments, the game algorithm device 810a may utilize wager data from the wager database 840a and/or player data from the player database 840c to determine one or more game outcomes, results based on the outcomes, and/or awards in accordance with the game results. In some embodiments, the game algorithm device 810a may utilize and/or allocate monetary value data such as defined by a wager pool 844a to determine and/or allocate the awards. Output from the game algorithm device 810a may include, for example, a game outcome 844b, that may be stored in a results (or fourth) database 840d. According to some embodiments, the game outcome 844b may comprise an outcome of an online wagering game such as an online poker game (e.g., a primary game), determined in accordance with online poker game rules. According to some embodiments, the game algorithm device 810a may comprise a Random Number Generator (RNG) device, such as for generating random numbers and/or outcomes of a game.

In some embodiments, a second or promotion algorithm device 810b may execute and/or implement a promotion and/or secondary game (e.g., in connection with, but separate from, the primary game executed by the game algorithm device 810a). In some embodiments, the promotion algorithm device 810b may utilize location data from the location database 840b and/or player data from the player database 840c to determine one or more promotion outcomes, results based on the outcomes, and/or awards in accordance with the promotion results. In some embodiments, the promotion algorithm device 810b may utilize and/or allocated monetary value data such as defined by a promotion pool 844c to determine and/or allocate the awards. Output from the promotion algorithm device 810b may include, for example, a promotion outcome 844d, that may be stored in the results (or fourth) database 840d. According to some embodiments, the promotion outcome 844d may comprise an outcome of an online gaming promotion such as a "seat prize" promotion as described herein. In some embodiments, the promotion outcome 844d and the game outcome 844b may be separate and/or separately determined. The game outcome 844b may specifically not take into account location information but be specifically based at least in part on the wager data, while the promotion outcome 844d may be specifically determined based on the location information but specifically not based on (e.g., agnostic to) the wager data.

According to some embodiments, a dispensing device 860 may be activated to provide an award to a player 802a-n based on both of the game outcome 844b and the promotion outcome 844d. As depicted, for example, the dispensing device 860 may receive either or both of the location data and the player data corresponding to, for example, the first player 802a, and may dispense and/or otherwise provide the combined promotion and game award directly to the first location "Location #1".

VII. Apparatus and Articles of Manufacture

Figure 9:
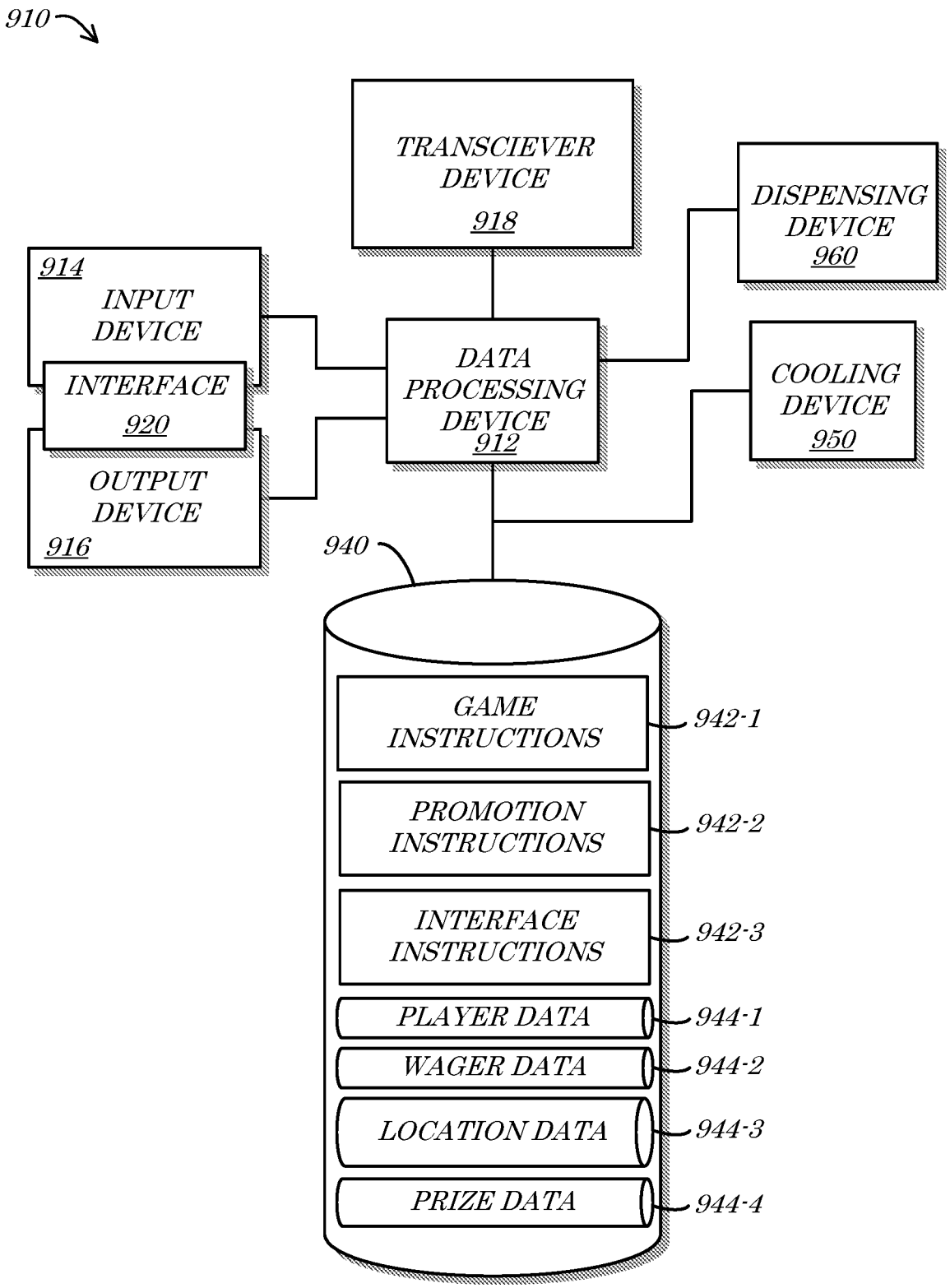
FIG. 9 is a block diagram of an apparatus according to some embodiments.
Figure 10A:
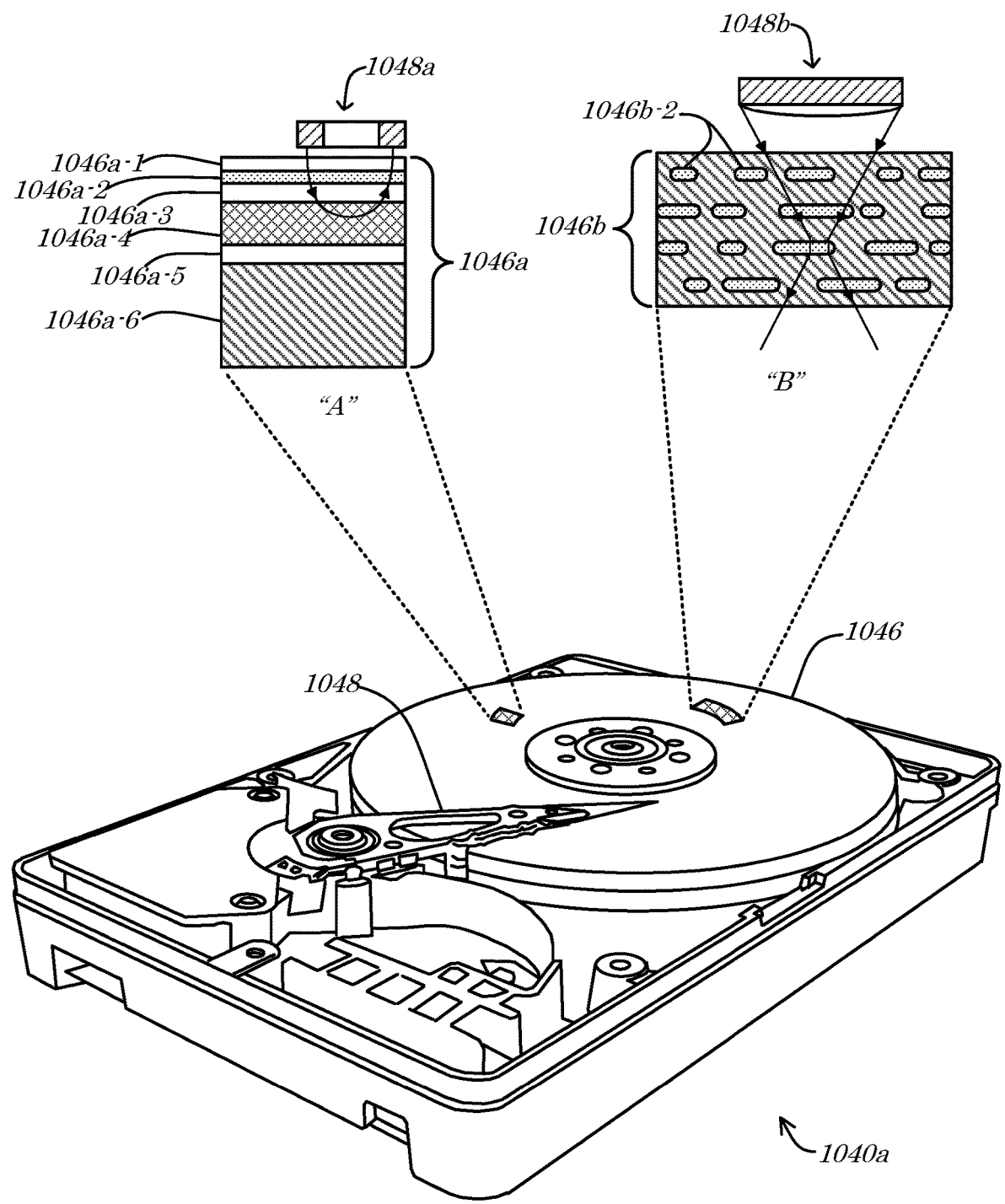
FIG. 10A, FIG. 10B, FIG. 10C, FIG. 10D, and FIG. 10E are perspective diagrams of exemplary data storage devices according to some embodiments.
Figure 10B:
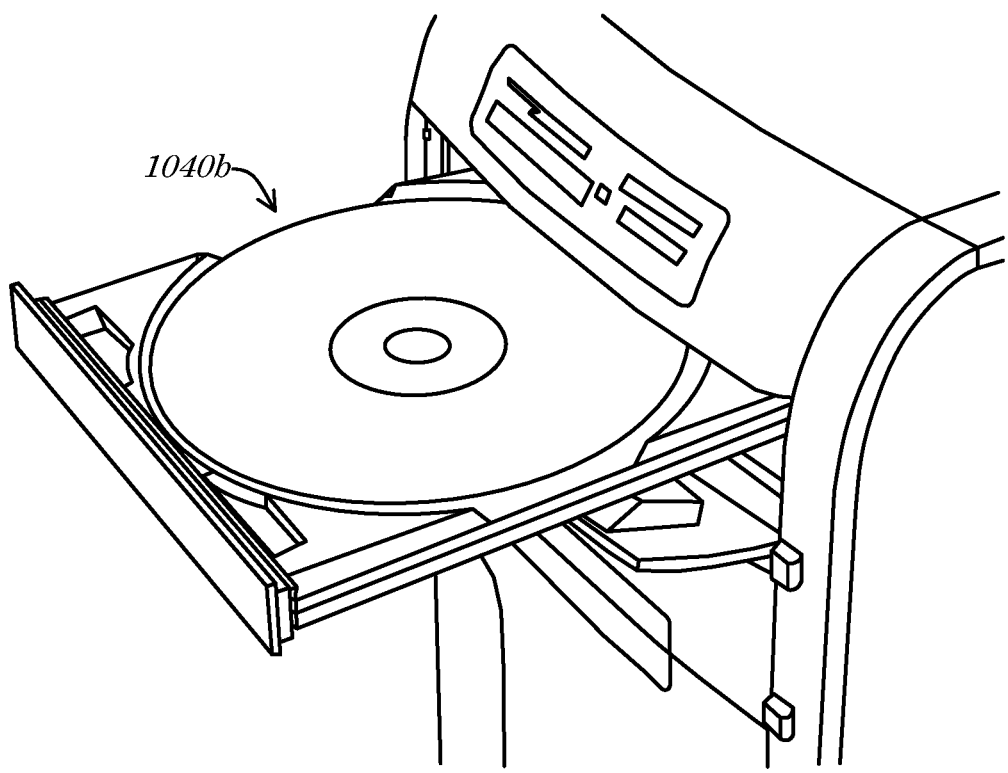
Figure 10C:
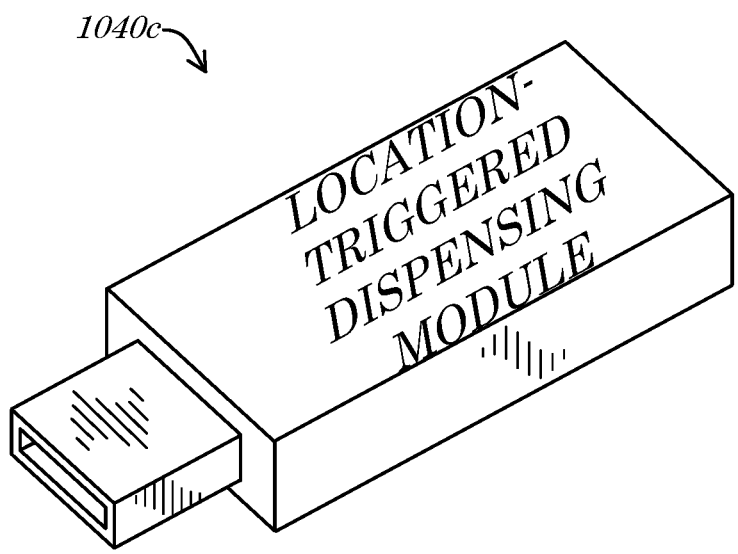
Figure 10D:
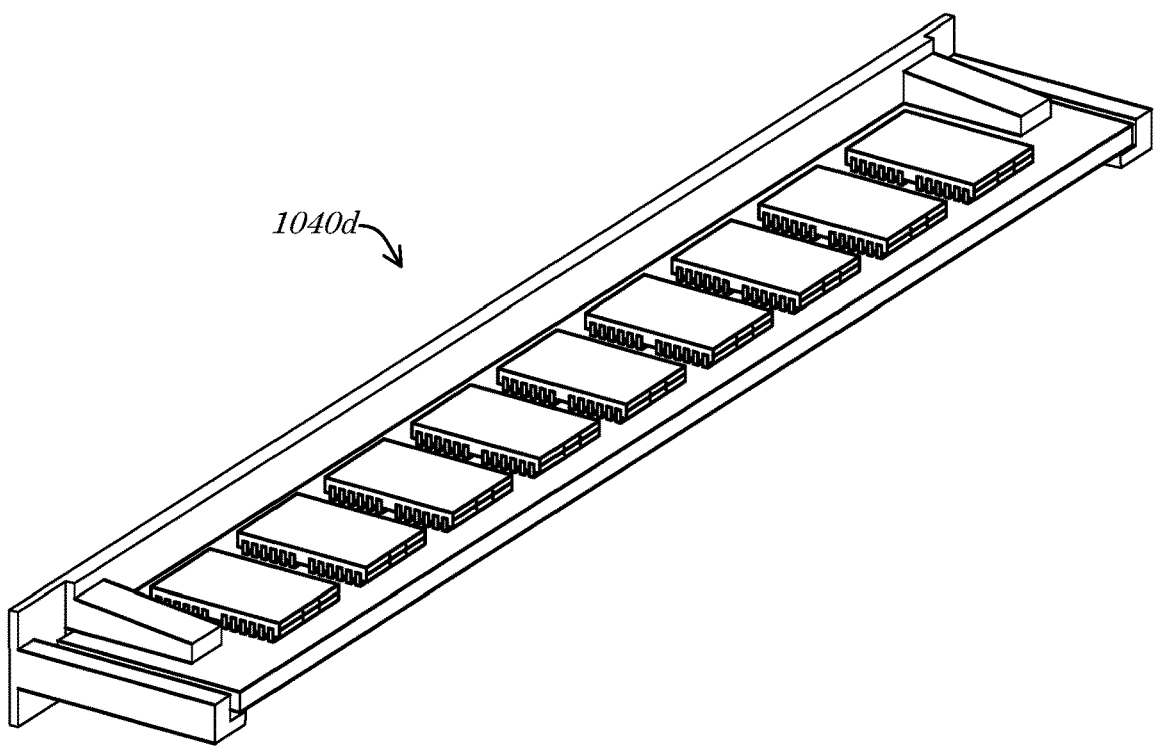
Figure 10E:
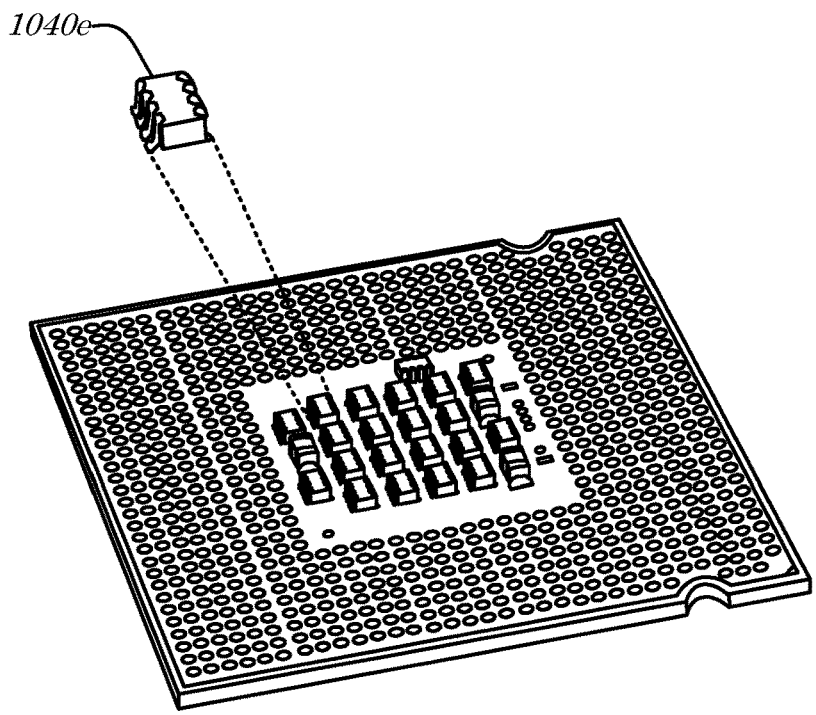

Turning to FIG. 9, a block diagram of an apparatus 910 according to some embodiments is shown. In some embodiments, the apparatus 910 may be similar in configuration and/or functionality to any of the location/player and/or user devices 102a-n, 202a-n, 302a-b, 402, 502 and/or the servers and/or controller devices 110, 210a-n, 310a-g, 410e-f, 510a-j of FIG. 1, FIG. 2, FIG. 3, FIG. 4, and/or FIG. 5 herein, and/or may otherwise comprise a portion of the systems 100, 200, 300, 400, 500 of FIG. 1, FIG. 2, FIG. 3, FIG. 4, and/or FIG. 5 herein. The apparatus 910 may, for example, execute, process, facilitate, and/or otherwise be associated with the method 700 and/or the system operations 800 described in conjunction with FIG. 7 and/or FIG. 8 herein, and/or one or more portions thereof. In some embodiments, the apparatus 910 may comprise a data processing device 912, an input device 914, an output device 916, a transceiver device 918, an interface 920, a memory device 940 (storing various programs and/or instructions 942 and data 944), a cooling device 950, and/or a dispensing device 960. According to some embodiments, any or all of the components 912, 914, 916, 918, 920, 940, 942, 944, 950, 960 of the apparatus 910 may be similar in configuration and/or functionality to any similarly named and/or numbered components described herein. Fewer or more components 912, 914, 916, 918, 920, 940, 942, 944, 950, 960 and/or various configurations of the components 912, 914, 916, 918, 920, 940, 942, 944, 950, 960 be included in the apparatus 910 without deviating from the scope of embodiments described herein.

According to some embodiments, the data processing device 912 may be or include any type, quantity, and/or configuration of electronic and/or computerized processor that is or becomes known. The data processing device 912 may comprise, for example, an Intel® IXP 2800 network processor or an Intel® XEON™ Processor coupled with an Intel® E7501 chipset. In some embodiments, the data processing device 912 may comprise multiple inter-connected processors, microprocessors, and/or micro-engines. According to some embodiments, the data processing device 912 (and/or the apparatus 910 and/or portions thereof) may be supplied power via a power supply (not shown) such as a battery, an Alternating Current (AC) source, a Direct Current (DC) source, an AC/DC adapter, solar cells, and/or an inertial generator. In the case that the apparatus 910 comprises a server such as a blade server, necessary power may be supplied via a standard AC outlet, power strip, surge protector, a PDU, and/or Uninterruptible Power Supply (UPS) device. According to some embodiments, the data processing device 912 may comprise or be in communication with a Random Number Generator (RNG) device (not separately depicted), such as for generating random numbers and/or outcomes of a game.

In some embodiments, the input device 914 and/or the output device 916 are communicatively coupled to the data processing device 912 (e.g., via wired and/or wireless connections and/or pathways) and they may generally comprise any types or configurations of input and output components and/or devices that are or become known, respectively. The input device 914 may comprise, for example, a keyboard that allows an operator of the apparatus 910 to interface with the apparatus 910 (e.g., by a player, such as to participate in an online game session having variable payouts, as described herein) and/or may comprise a currency acceptance device that accepts wagers for an online game. The output device 916 may, according to some embodiments, comprise a display screen and/or other practicable output component and/or device. The output device 916 may, for example, provide a game interface such as the interface 920 to a player (e.g., via a website). In some embodiments, the interface 920 may comprise portions and/or components of either or both of the input device 914 and the output device 916. According to some embodiments, the input device 914 and/or the output device 916 may, for example, comprise and/or be embodied in an input/output and/or single device such as a touch-screen monitor (e.g., that enables both input and output via the interface 920). According to some embodiments, wager information and/or location information may be provided via the interface 920.

In some embodiments, the transceiver device 918 may comprise any type or configuration of communication device that is or becomes known or practicable. The transceiver device 918 may, for example, comprise a network interface card (NIC), a telephonic device, a cellular network device, a router, a hub, a modem, and/or a communications port or cable. In some embodiments, the transceiver device 918 may be coupled to provide data to a player device (not shown in FIG. 9), such as in the case that the apparatus 910 is utilized to provide a game interface to a player as described herein. The transceiver device 918 may, for example, comprise a cellular telephone network transmission device that sends signals indicative of game interface components to customer and/or subscriber handheld, mobile, and/or telephone device. According to some embodiments, the transceiver device 918 may also or alternatively be coupled to the data processing device 912. In some embodiments, the transceiver device 918 may comprise an IR, RF, Bluetooth™, and/or Wi-Fi® network device coupled to facilitate communications between the data processing device 912 and another device (such as a player device and/or a third-party device).

The memory device 940 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 940 may, according to some embodiments, store one or more of game instructions 942-1, promotion instructions 942-2, interface instructions 942-3, player data 944-1, wager data 944-2, location data 944-3, and/or award or prize data 944-4. In some embodiments, the game instructions 942-1, promotion instructions 942-2, interface instructions 942-3, player data 944-1, wager data 944-2, location data 944-3, and/or award or prize data 944-4 may be utilized by the data processing device 912 to provide output information via the output device 916 and/or the transceiver device 918.

According to some embodiments, the game instructions 942-1 may be operable to cause the data processing device 912 to process player data 944-1, wager data 944-2, location data 944-3, and/or award or prize data 944-4. Player data 944-1, wager data 944-2, location data 944-3, and/or award or prize data 944-4 received via the input device 914 and/or the transceiver device 918 may, for example, be analyzed, sorted, filtered, decoded, decompressed, ranked, scored, plotted, and/or otherwise processed by the data processing device 912 in accordance with the game instructions 942-1. In some embodiments, player data 944-1, wager data 944-2, location data 944-3, and/or award or prize data 944-4 may be fed by the data processing device 912 through one or more mathematical and/or statistical formulas and/or models in accordance with the game instructions 942-1 to provide games having variable result features and/or functionality in accordance with embodiments described herein. The variable game results may, for example, be specifically based on the player data 944-1 and/or the wager data 944-2, and in some embodiments may specifically exclude and/or not take into account the location data 944-3.

In some embodiments, the promotion instructions 942-2 may be operable to cause the data processing device 912 to process player data 944-1, wager data 944-2, location data 944-3, and/or award or prize data 944-4. Player data 944-1, wager data 944-2, location data 944-3, and/or award or prize data 944-4 received via the input device 914 and/or the transceiver device 918 may, for example, be analyzed, sorted, filtered, decoded, decompressed, ranked, scored, plotted, and/or otherwise processed by the data processing device 912 in accordance with the promotion instructions 942-2. In some embodiments, player data 944-1, wager data 944-2, location data 944-3, and/or award or prize data 944-4 may be fed by the data processing device 912 through one or more mathematical and/or statistical formulas and/or models in accordance with the promotion instructions 942-2 to provide games having variable result features (e.g., based on "seat prize" promotion features) and/or functionality in accordance with embodiments described herein. The variable game results and/or promotion component thereof may, for example, be specifically based on the location data 944-3 and in some embodiments may specifically exclude and/or not take into account the player data 944-1 and/or the wager data 944-2.

According to some embodiments, the interface instructions 942-2 may be operable to cause the data processing device 912 to process player data 944-1, wager data 944-2, location data 944-3, and/or award or prize data 944-4. Player data 944-1, wager data 944-2, location data 944-3, and/or award or prize data 944-4 received via the input device 914 and/or the transceiver device 918 may, for example, be analyzed, sorted, filtered, decoded, decompressed, ranked, scored, plotted, and/or otherwise processed by the data processing device 912 in accordance with the interface instructions 942-2. In some embodiments, player data 944-1, wager data 944-2, location data 944-3, and/or award or prize data 944-4 may be fed by the data processing device 912 through one or more mathematical and/or statistical formulas and/or models in accordance with the interface instructions 942-2 to provide one or more game interfaces (such as the interface 920) such as to provide games having variable result functionality and/or to output awards, in accordance with embodiments described herein.

Any or all of the exemplary instructions and data types described herein and other practicable types of data may be stored in any number, type, and/or configuration of memory devices that is or becomes known. The memory device 940 may, for example, comprise one or more data tables or files, databases, table spaces, registers, and/or other storage structures. In some embodiments, multiple databases and/or storage structures (and/or multiple memory devices 940) may be utilized to store information associated with the apparatus 910. According to some embodiments, the memory device 940 may be incorporated into and/or otherwise coupled to the apparatus 910 (e.g., as shown) or may simply be accessible to the apparatus 910 (e.g., externally located and/or situated).

In some embodiments, the apparatus 910 may comprise a cooling device 950. According to some embodiments, the cooling device 950 may be coupled (physically, thermally, and/or electrically) to the data processing device 912 and/or to the memory device 940. The cooling device 950 may, for example, comprise a fan, heat sink, heat pipe, radiator, cold plate, and/or other cooling component or device or combinations thereof, configured to remove heat from portions or components of the apparatus 910.

According to some embodiments, the apparatus 910 may comprise a dispensing device 960. The dispensing device 960 may comprise, for example, a TITO and/or other printer device, a projection device, and/or a physical monetary value dispensing device such as a coin dispenser and/or a magnetic card reader/writer. In some embodiments, the dispensing device 960 may comprise a Bluetooth®, Near-Field Communication (NFC), and/or other short-range communications protocol device operable to transmit indications of monetary value over short distances. In some embodiments, the dispensing device 960 may be located remotely from the apparatus 910 and may merely be in electronic communication therewith, such as for receive location-triggered dispensing commands and/or instructions or signals.

Referring to FIG. 10A, FIG. 10B, FIG. 10C, FIG. 10D, and FIG. 10E, perspective diagrams of exemplary data storage devices 1040a-e according to some embodiments are shown. The data storage devices 1040a-e may, for example, be utilized to store instructions and/or data such as the game instructions 942-1, promotion instructions 942-2, interface instructions 942-3, player data 944-1, wager data 944-2, location data 944-3, and/or award or prize data 944-4, each of which is described in reference to FIG. 9 herein. In some embodiments, instructions stored on the data storage devices 1040a-e may, when executed by a processor (such as the data processor device 912 of FIG. 9), cause the implementation of and/or facilitate the method 700 and/or the system operations 800 described in conjunction with FIG. 7 and/or FIG. 8 herein, and/or portions thereof.

According to some embodiments, the first data storage device 1040a may comprise one or more various types of internal and/or external hard drives. The first data storage device 1040a may, for example, comprise a data storage medium 1046 that is read, interrogated, and/or otherwise communicatively coupled to and/or via a disk reading device 1048. In some embodiments, the first data storage device 1040a and/or the data storage medium 1046 may be configured to store information utilizing one or more magnetic, inductive, and/or optical means (e.g., magnetic, inductive, and/or optical-encoding). The data storage medium 1046, depicted as a first data storage medium 1046a for example (e.g., breakout cross-section "A"), may comprise one or more of a polymer layer 1046a-1, a magnetic data storage layer 1046a-2, a non-magnetic layer 1046a-3, a magnetic base layer 1046a-4, a contact layer 1046a-5, and/or a substrate layer 1046a-6. According to some embodiments, a magnetic read head 1046a may be coupled and/or disposed to read data from the magnetic data storage layer 1046a-2.

In some embodiments, the data storage medium 1046, depicted as a second data storage medium 1046b for example (e.g., breakout cross-section "B"), may comprise a plurality of data points 1046b-2 disposed with the second data storage medium 1046b. The data points 1046b-2 may, in some embodiments, be read and/or otherwise interfaced with via a laser-enabled read head 1048b disposed and/or coupled to direct a laser beam through the second data storage medium 1046b.

In some embodiments, the second data storage device 1040b may comprise a CD, CD-ROM, DVD, Blu-Ray™ Disc, and/or other type of optically-encoded disk and/or other storage medium that is or becomes know or practicable. In some embodiments, the third data storage device 1040c may comprise a USB keyfob, dongle, and/or other type of flash memory data storage device that is or becomes know or practicable. In some embodiments, the fourth data storage device 1040d may comprise RAM of any type, quantity, and/or configuration that is or becomes practicable and/or desirable. In some embodiments, the fourth data storage device 1040d may comprise an off-chip cache such as a Level 2 (L2) cache memory device. According to some embodiments, the fifth data storage device 1040e may comprise an on-chip memory device such as a Level 1 (L1) cache memory device.

The data storage devices 1040a-e may generally store program instructions, code, and/or modules that, when executed by a processing device cause a particular machine to function in accordance with one or more embodiments described herein. The data storage devices 1040a-e depicted in FIG. 10A, FIG. 10B, FIG. 10C, FIG. 10D, and FIG. 10E are representative of a class and/or subset of computer-readable media that are defined herein as "computer-readable memory" (e.g., non-transitory memory devices as opposed to transmission devices or media).

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined above and includes many exemplary protocols that are also applicable here.

In some embodiments, one or more specialized machines such as a computerized processing device, a server, a remote terminal, and/or a customer device may implement the various practices described herein. A computer system of an gaming entity may, for example, comprise various specialized computers that interact to provide for online games as described herein The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

What is claimed is:

1. A system for location-triggered remote dispensing device activation for an online poker game, the online poker game comprising a primary multiplayer game governed by game play rules that take into account game play actions occurring at different virtual seating positions to define a game play outcome, comprising:
   a central server device comprising a plurality of data processing units;
   a transceiver device in communication with the central server device and a plurality of remote location devices, each location device being associated with a different remote user and a different one of the virtual seating positions;
   a plurality of non-transitory data storage devices in communication with the central server and the transceiver device; and
   a remote dispensing device in communication with at least one of the central server device and the transceiver device, the system being responsive to command signals transmitted from the plurality of data processing units to:
      receive, by the transceiver device and from each remote location device of the plurality of remote location devices, an indication of a monetary amount, the monetary amounts being summed to define a combined monetary amount;
      allocate, by the central server device, a portion of the combined monetary amount to a monetary pool of the online poker game;
      determine, by the central server device and for a plurality of undisclosed shares of the monetary pool, a value for each of the undisclosed shares of the monetary pool of the online poker game;
      allocate, by the central server device, at least one of the plurality of undisclosed shares of the monetary pool to each of the different virtual seating positions of the online poker game;
      determine, by the central server device and based on one or more data processing rules executed by at least two of the data processing units of the plurality of data processing units, and after the allocating of the plurality of undisclosed shares of the monetary pool to each of the different virtual seating positions of the online poker game, the game play outcome for the online poker game;
      identify, by the central server device and based on the game play outcome for the online poker game, a first one of the remote users as a winner of a hand of the online poker game; and
      dispense, by the remote dispensing device and in response to a triggering command received from the central server device, and to the identified first one of the remote users, a first portion of the monetary pool that is based on the allocation of the undisclosed shares of the monetary pool to the virtual seating position in the online poker game of the identified first one of the remote users.

2. The system of claim 1, wherein the system is further responsive to command signals transmitted from the plurality of data processing units to:
   identify, by the central server device and based on the game play outcome, a second one of the remote users that is not a winner of the online poker game; and
   dispense, by the remote dispensing device and in response to a triggering command received from the central server device, and to the identified second one of the remote users, a second portion of the monetary pool that is based on the allocation of the undisclosed shares of the monetary pool to the virtual seating position in the online poker game of the identified second one of the remote users.

3. The system of claim 2, wherein the second portion of the monetary pool is larger than the first portion of the monetary pool.

4. The system of claim 1, wherein the existence of the undisclosed shares of the monetary pool is hidden from the remote users until the dispensing.

5. The system of claim 1, wherein the system is further responsive to command signals transmitted from the plurality of data processing units to:
   determine, by the central server device, the portion of the combined monetary amount to allocate to the monetary pool.

6. The system of claim 5, wherein the portion of the combined monetary amount allocated to the monetary pool comprises a fixed monetary amount.

7. The system of claim 5, wherein the portion of the combined monetary amount allocated to the monetary pool comprises a fixed percentage of the combined monetary amount.

8. The system of claim 5, wherein the portion of the combined monetary amount allocated to the monetary pool comprises one or more of: (i) a randomly-selected monetary amount; and (ii) a randomly-selected percentage of the monetary pool.

9. The system of claim 1, wherein the system is further responsive to command signals transmitted from the plurality of data processing units to:
   reveal, by the central server and to at least one of the remote users, the at least one of the plurality of undisclosed shares of the monetary pool allocated to the virtual seating position in the online poker game of the at least one of the remote users.

* * * * *